United States Patent
Diem et al.

(10) Patent No.: US 10,175,042 B2
(45) Date of Patent: Jan. 8, 2019

(54) ADAPTIVE COMPASS CALIBRATION BASED ON LOCAL FIELD CONDITIONS

(71) Applicant: GoPro, Inc., San Mateo, CA (US)

(72) Inventors: Fabio Diem, Zurich (CH); Tim Oberhauser, Basel (CH); Sammy Omari, Zurich (CH)

(73) Assignee: GoPro, Inc., San Mateo, CA (US)

( * ) Notice: Subject to any disclaimer, the term of this patent is extended or adjusted under 35 U.S.C. 154(b) by 232 days.

(21) Appl. No.: 15/348,958

(22) Filed: Nov. 10, 2016

(65) Prior Publication Data

US 2018/0112980 A1     Apr. 26, 2018

Related U.S. Application Data

(60) Provisional application No. 62/411,596, filed on Oct. 22, 2016.

(51) Int. Cl.

| | |
|---|---|
| *G01C 17/38* | (2006.01) |
| *G01C 17/02* | (2006.01) |
| *B64C 39/02* | (2006.01) |
| *B64D 47/08* | (2006.01) |
| *G05D 1/00* | (2006.01) |

(52) U.S. Cl.
CPC ............ *G01C 17/38* (2013.01); *B64C 39/024* (2013.01); *B64D 47/08* (2013.01); *G01C 17/02* (2013.01); *G05D 1/0016* (2013.01); *G05D 1/0094* (2013.01); *B64C 2201/146* (2013.01)

(58) Field of Classification Search
CPC ........ G01C 17/02; G01C 17/38; G01C 19/00; G01C 21/00; G01C 21/005; G01C 21/165; G01C 3/085

USPC ............................................................ 33/301
See application file for complete search history.

(56) References Cited

U.S. PATENT DOCUMENTS

| | | | |
|---|---|---|---|
| 2016/0178371 A1* | 6/2016 | Morrison ............... | G01C 17/38 702/95 |
| 2018/0003777 A1* | 1/2018 | Sorensen ........... | G01R 33/0023 |
| 2018/0059205 A1* | 3/2018 | Yost ..................... | G01R 35/005 |
| 2018/0080768 A1* | 3/2018 | Vasilyuk ............... | G01C 17/28 |
| 2018/0112980 A1* | 4/2018 | Diem ..................... | G01C 17/38 |
| 2018/0120109 A1* | 5/2018 | Fite-Georgel .......... | G06T 17/05 |
| 2018/0180683 A1* | 6/2018 | Tarlow ............... | G01R 33/0035 |

* cited by examiner

*Primary Examiner* — Yaritza Guadalupe-McCall
(74) *Attorney, Agent, or Firm* — Young Basile Hanlon & MacFarlane, P.C.

(57) ABSTRACT

Disclosed is a system and method for calibrating a magnetometer of a compass. With a global navigation satellite system receiver, a current position is determined. The determined position is used to determine a magnetic inclination (e.g., by a global magnetic field model such as the World Magnetic Model). The calibration system may perform different calibration sequences based on the magnetic inclination. In a first calibration sequence, performed responsive to a determination that a magnetic inclination (or the absolute value of the magnetic inclination) is less than a threshold, magnetic field data is measured by the magnetometer as it is rotated through horizontal rotation paths. If the magnetic inclination is greater than the threshold, magnetic field data is measured by the magnetometer as it is rotated through vertical rotation paths. The measured magnetic field data may be used to determine calibration values for the magnetometer compass.

20 Claims, 19 Drawing Sheets

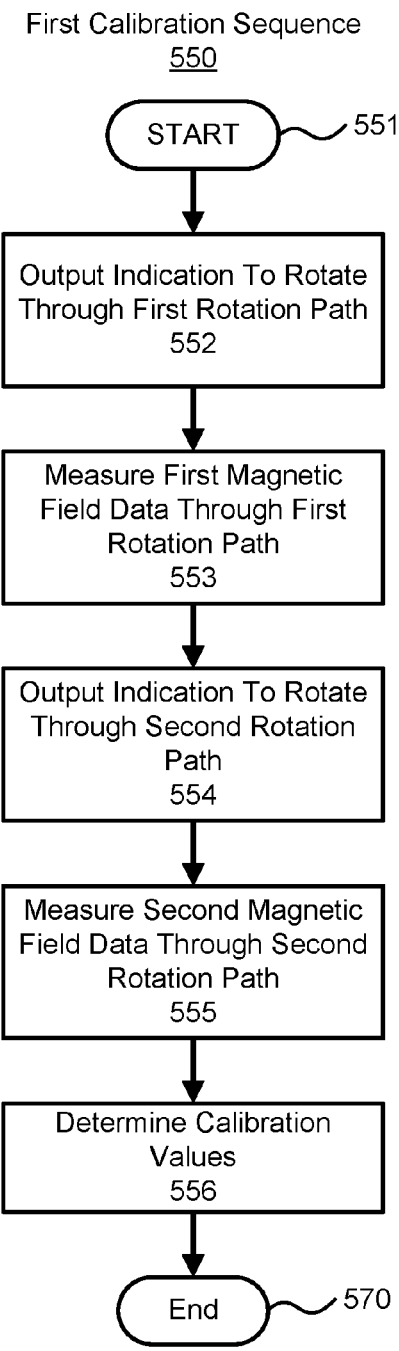
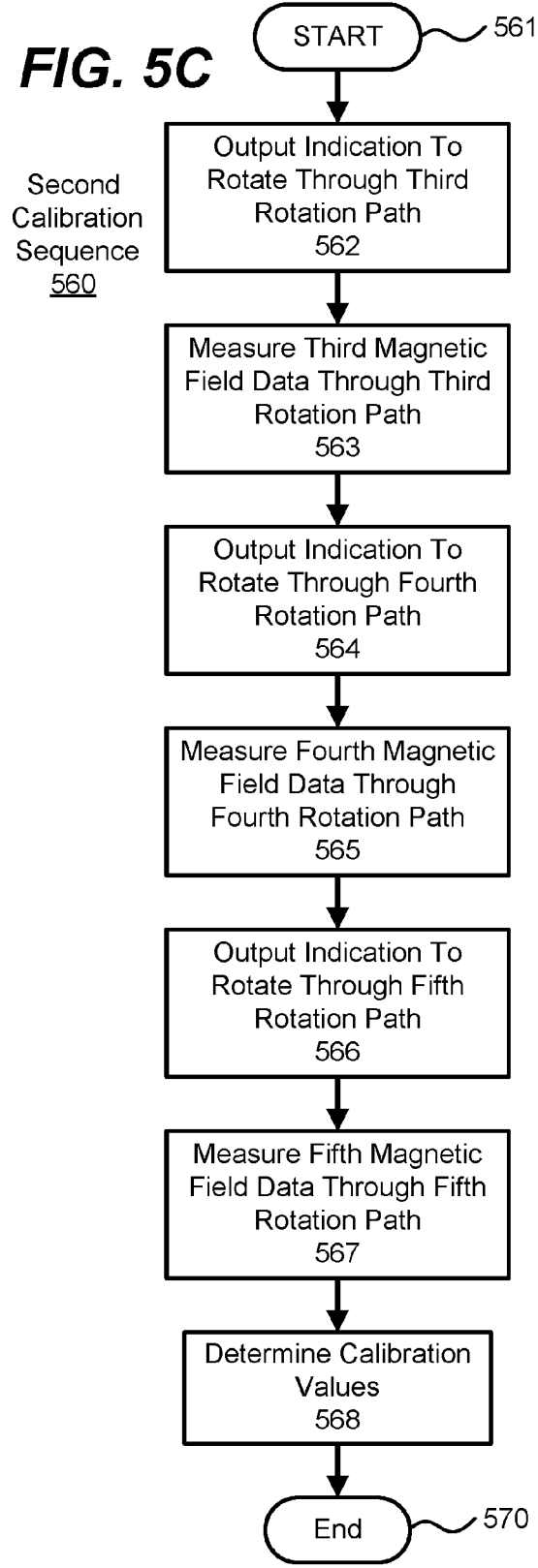

First Rotation Path
610

Second Rotation Path
620

FIG. 8A — First Screen 810
Initial Position Graphical Indication 812
Initial Position Text Indication 814
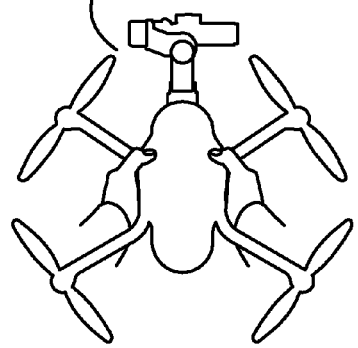
Hold UAV level with nose pointing away from you.
FIG. 8B — Second Screen 820
Rotation Graphical Indication 822
Rotation Text Indication 824
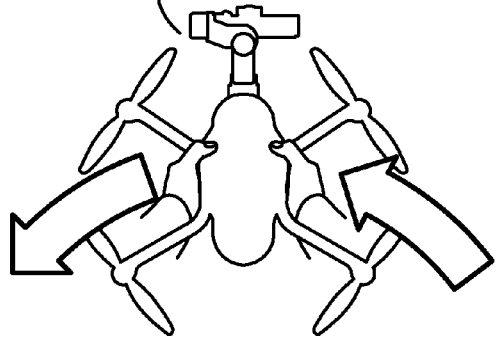
Keep UAV level while rotating horizontally in a full circle.

ADAPTIVE COMPASS CALIBRATION BASED ON LOCAL FIELD CONDITIONS

CROSS REFERENCE TO RELATED APPLICATIONS

This application claims the benefit of U.S. Patent Application No. 62/411,596, filed Oct. 22, 2016, the entire contents of which are incorporated by reference herein.

TECHNICAL FIELD

The disclosure generally relates to magnetometer compasses and in particular to adaptively calibrating a compass based on local magnetic field conditions.

BACKGROUND

A wide variety of unmanned aerial vehicles are used for commercial, scientific, and recreational purposes. For example, an aerial vehicle with an attached image capture device (e.g., a cameras and/or a video camera) may allow for the capture of images or video footage from vantage points that would otherwise be inaccessible to a photographer. Aerial vehicles may operate autonomously, be controlled by a user, or be controlled by a hybrid approach.

An autonomous or a remote controlled aerial vehicle may include a magnetometer compass that measures the earth's magnetic field, by which the orientation (e.g., the heading) of the aerial vehicle may be determined. The output of the sensors a magnetometer may be distorted by various factors, such as manufacturing inconsistencies, thermal effects on the sensors, cross-axis effects, hard-iron interference (e.g., magnetic fields produced by permanent magnets or magnetized iron/steel that are in the vicinity of the magnetometer), and soft-iron interference (e.g., magnetic fields produced by current-carrying traces or wires). For this reason, in order to accurately determine the orientation of the aerial vehicle, it is sometimes necessary to calibrate the compass.

Calibration procedures for a magnetometer are known. Generally, calibration involves manually rotating the aerial vehicle horizontally (i.e., rotating about a vertical axis). Often, the aerial vehicle is rotated horizontally multiple times with the aerial vehicle oriented differently each time. This method of calibrating the magnetometer generally performs well in areas where the earth's magnetic field has a substantial horizontal component. For example, a calibration method where the aerial vehicle is rotated horizontally would perform well in Havana, Cuba where the inclination (i.e., the angle between the magnetic field vector and a horizontal plane) is about 52° 23'. If the inclination is nearly horizontal, the direction of the magnetic field relative to the aerial vehicle, as measured by the magnetometer, will change significantly when the aerial vehicle is rotated horizontally about a vertical axis.

Although this type of calibration method may perform suitably where the direction of the earth's magnetic field is nearly horizontal (i.e., when the magnetic inclination is nearly zero), it may not be effective in areas where absolute value of the magnetic inclination is large (i.e., when the magnetic field has a large vertical component). This is because rotating the aerial vehicle horizontally will not greatly change the direction of the magnetic field relative to the aerial vehicle. Thus, in a place like Ísafjörður, Iceland, where the magnetic inclination is 76° 41', or in Alert in the Qikiqtaaluk Region of Canada, where the magnetic inclination is 86° 20', the calibration procedures disclosed in the prior art may perform poorly. As another example, the magnetic inclination at Campbell Island, New Zealand, is about −75° 26', which may also cause inaccurate calibration when the calibration systems of existing aerial vehicles are used.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 5B-5C illustrate respective flow diagrams for example first and second calibration sequences.

FIGS. 8A-8B illustrate an example user interface indicating instructions for calibrating the compass of an aerial vehicle.

DETAILED DESCRIPTION

Figure 1:
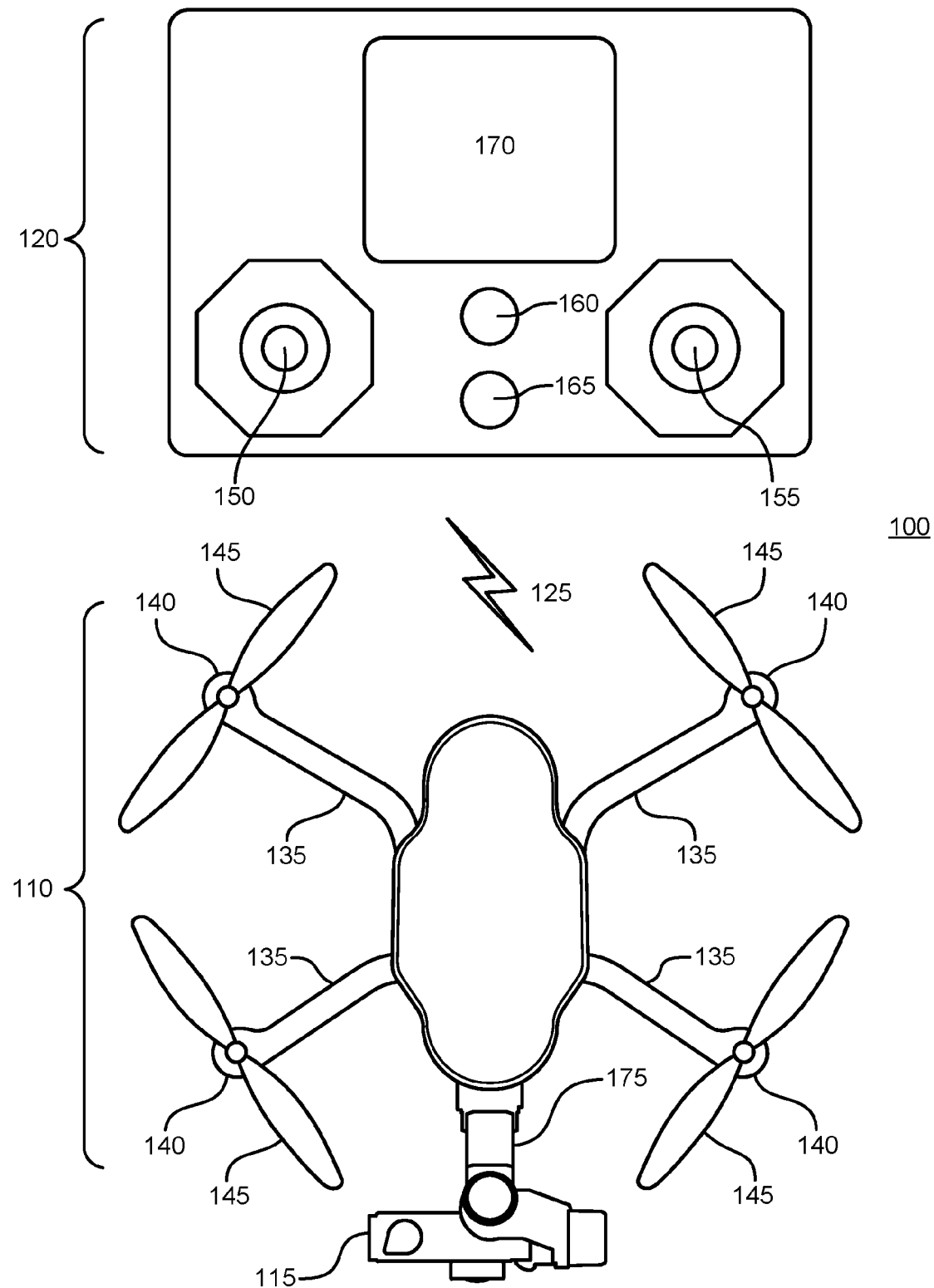
FIG. 1 illustrates an example configuration of remote controlled aerial vehicle in communication with a remote controller.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An adaptive calibration procedure, as disclosed herein, that is based on a determination of the magnetic inclination at a given position may perform efficaciously in any location on Earth without requiring an overlong calibration procedure. Thus, the magnetometer may remain usable and convenient without compromising its utility in places where the earth's magnetic field is substantially vertical. Disclosed by way of example embodiments is a system and method for calibrating a magnetometer of a compass. With a global navigation satellite system (GNSS) receiver (e.g., a global positioning system (GPS) receiver), a current position is determined. The determined position is used to determine a magnetic inclination (e.g., by a global magnetic field model such as the World Magnetic Model). The calibration system may perform different calibration sequences based on the magnetic inclination.

In a first calibration sequence, performed responsive to a determination that a magnetic inclination (or the absolute value of the magnetic inclination) is less than a threshold, magnetic field data is measured by the magnetometer as it is rotated through horizontal rotation paths. In a second calibration sequence, performed responsive to a determination that a magnetic inclination (or the absolute value of the magnetic inclination) is greater than the threshold, magnetic field data is measured by the magnetometer as it is rotated through vertical rotation paths. The measured magnetic field data may be used to determine calibration values for the magnetometer compass.

By adding vertical rotations (e.g., rotations about a horizontal axis) to a calibration sequence of a magnetometer, the poor performance of existing magnetometer calibration systems in places with a substantially vertical magnetic inclination may be obviated. For example, an aerial vehicle with a magnetometer may be calibrated by performing a sequence of six rotations: three vertical and three horizontal. Although such a calibration procedure would generally be effective for calibrating a magnetometer anywhere on Earth regardless of the magnetic inclination, the calibration procedure would be longer, more cumbersome, and potentially more confusing for a user than conventional calibration procedures.

Although the method and system for calibrating a compass is described herein with reference to an aerial vehicle, it will be readily recognized that, in alternative embodiments, the structures, systems, and methods disclosed herein may be employed in other devices without departing from the principles of what is claimed herein. For example, methods and systems disclosed herein for calibrating a compass may alternately be implemented by another device with a compass such as another remote controlled or autonomous vehicle (e.g., a floating water vessel, an underwater vessel, a lighter-than-air aircraft, a glider, a land vehicle, or a rocket), a remote controller of a vehicle, a mobile computing device (e.g., a smartphone, a tablet computer, a head-mounted display, or a laptop computer), or a game controller.

Example System Configuration

Turning now to FIG. 1, it illustrates an example configuration 100 of an aerial vehicle 110 in communication with a remote controller 120. The configuration 100 includes an aerial vehicle 110 and a remote controller 120. The aerial vehicle 110 and the remote controller 120 may be communicatively coupled through a wireless link 125. The wireless link may be a wireless local area network (e.g., Wi-Fi), cellular (e.g., long term evolution (LTE), 3G, 4G, 5G), and/or other wireless communication link. The aerial vehicle 110 may be, for example, a quadcopter, another multirotor helicopter, or a fixed wing aerial vehicle.

The aerial vehicle 110 in this example may include a housing 130 for a payload (e.g., electronics, storage media, and/or camera), multiple arms 135, multiple thrust motors 140, and multiple propellers 145. Each arm 135 may mechanically couple with a respective thrust motor 140 that couples a propeller 145 to create a rotary assembly. When the rotary assembly is operational, the propellers 145 spin at appropriate speeds and directions to allow the aerial vehicle 110 to lift (take off), land, hover, rotate, and move in flight.

The remote controller 120 in this example includes a first control panel 150 and a second control panel 155, an ignition button 160, a return button 165 and a screen 170. A first control panel, e.g., control panel 150, may be used to control "up-down" direction (e.g. lift and landing) of the aerial vehicle 110. A second control panel, e.g., control panel 155, may be used to control "forward-reverse" direction of the aerial vehicle 110. Each control panel 150, 155 may be structurally configured as a joystick controller and/or touch pad controller. The ignition button 160 may be used to start the rotary assembly (e.g., start the respective thrust motors coupled with the propellers 145). The return (or come home) button 165 may be used to override the controls of the remote controller 120 and transmit instructions to the aerial vehicle 110 to return to a predefined location as further described herein. The ignition button 160 and the return button 165 may be mechanical and/or solid state press sensitive buttons. In addition, each button may be illuminated with one or more light emitting diodes (LED) to provide additional details. For example, an LED of the ignition button 160 may switch from one visual state to another to indicate whether the aerial vehicle 110 is ready to fly (e.g., lit green) or not (e.g., lit red). Also, an LED of the return button 165 may switch between visual states to indicate whether the aerial vehicle 110 is now in an override mode on return path (e.g., lit yellow) or not (e.g., lit red). It also is noted that the remote controller 120 may include other dedicated hardware buttons and switches and those buttons and switches may be solid state buttons and switches.

The remote controller 120 may also include a screen (or display) 170. The screen 170 may provide for visual display. The screen 170 may be a touch sensitive screen. The screen 170 also may be, for example, a liquid crystal display (LCD), an LED display, an organic LED (OLED) display, and/or a plasma screen. The screen 170 may allow for display of information related to the remote controller 120, such as menus for configuring the remote controller 120 and/or remotely configuring the aerial vehicle 110. The screen 170 also may display images captured from an image capture device coupled with the aerial vehicle 110.

Aerial Vehicle

Figure 2:
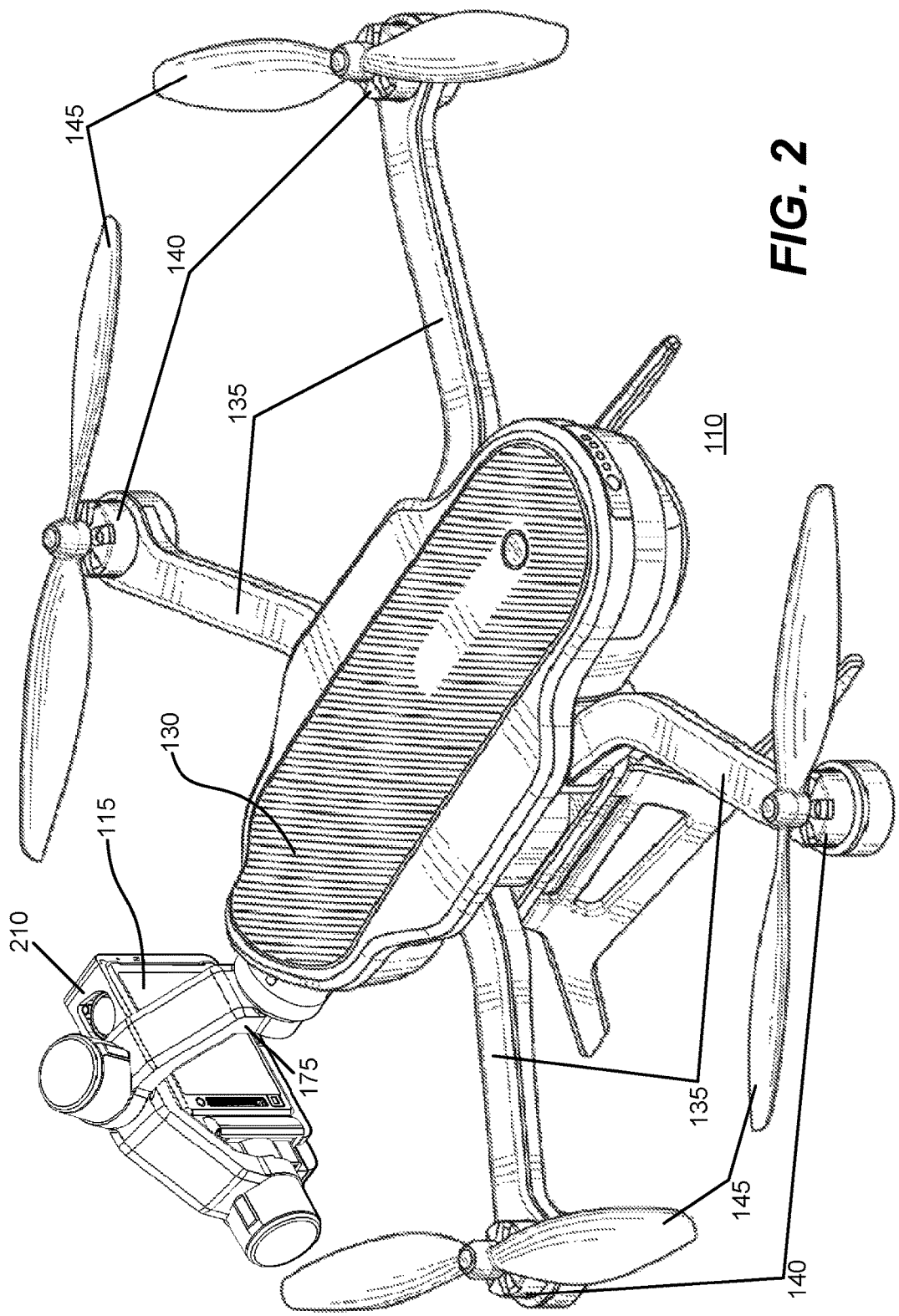
FIG. 2 illustrates an example of a remote controlled aerial vehicle.

Referring now to FIG. 2, it illustrates an example embodiment of the aerial vehicle 110. The aerial vehicle 110 in this example is shown with the housing 130 and the arms 135 of the arm assembly. In addition, this example embodiment shows a thrust motor 140 coupled with the end of each arm 135 of the arm assembly, a gimbal 175, a camera frame 210, and a camera 115. The thrust motor 140 couples with the propellers 145 to spin the propellers 145 when the thrust motors 140 are operational.

The gimbal 175 may be configured to allow for rotation of an object about an axis. The gimbal 175 may be a 3-axis gimbal 175 with three motors, each corresponding to a respective axis. Here, the object that the gimbal 175 rotates is a camera 115 coupled to camera frame 210 to which the gimbal 175 is mechanically coupled. The gimbal 175 and the camera frame 210 may form a mounting structure and when coupled together the entire assembly may be referenced as a gimbal 175 for ease of discussion. The camera frame 210 may be configured to allow the camera 115 to detachably couple (e.g., attach) to it and may include electrical connection points for the coupled camera 115. The gimbal 175 may allow for the camera frame 210 to maintain a particular position and/or orientation so that the camera 115 mounted to it can remain steady as the aerial vehicle 110 is in flight. In some embodiments, the camera frame 210 may be integrated into the gimbal 175 as a camera mount. In some embodiments, the camera frame 210 may be omitted and the gimbal 175 couples electronically and mechanically to the camera 115.

Figure 3A:
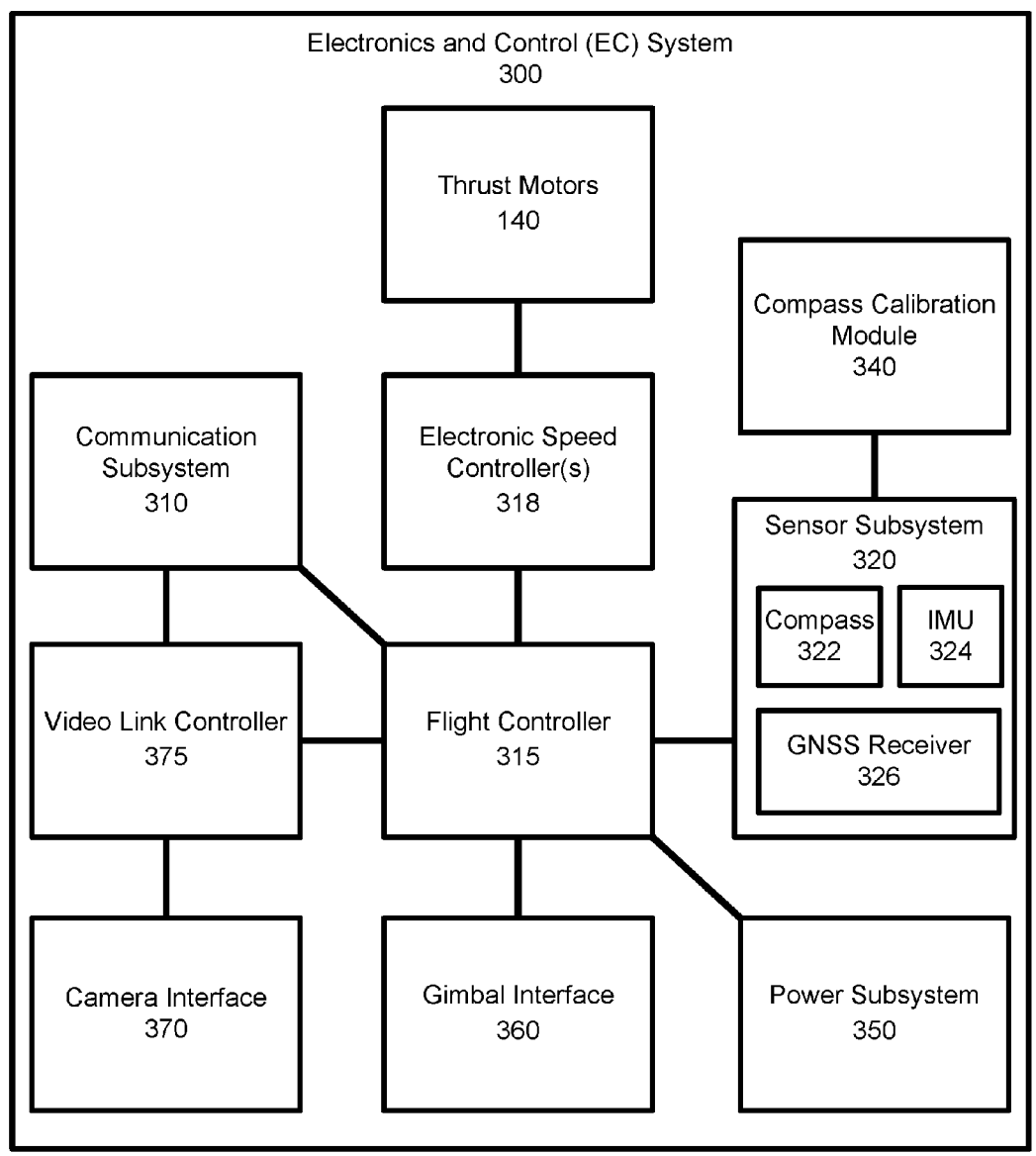
FIG. 3A illustrates an example of an electronics and control system for an aerial vehicle.

FIG. 3A illustrates an example embodiment of an electronics and control (EC) system 300 of the aerial vehicle 110. The EC system 300 may include a communication subsystem 310, a flight controller 315, one or more electronic speed controllers (ESCs) 318, one or more thrust motors 140, a sensor (or telemetric) subsystem 320, a compass calibration module 340, a power subsystem 350, a gimbal interface 360, a camera interface 370, and a video link controller 375. The components may communicate directly or indirectly with each other through one or more data busses on the aerial vehicle 110.

The communication subsystem 310 may transmit and/or receive data wirelessly over a wireless network (e.g., the wireless link 125). In one embodiment, the communication subsystem 310 may be a long-range Wi-Fi system. It also may include or be another wireless communication system, for example, one based on long term evolution (LTE), 3G, 4G, and/or 5G mobile communication standards. The communication subsystem 310 also may be configured with a unidirectional RC channel for communication of controls from an external device (e.g., the remote controller 120, another remote controlled aerial vehicle, a personal computer (PC), a laptop computer, or a mobile device, such as smartphone or tablet computer) to the aerial vehicle 110 and a separate unidirectional channel for video downlink from the aerial vehicle 110 (e.g., to the remote controller 120 or to a video receiver where direct video connection may be desired).

The flight controller 315 may control the flight related operations of the aerial vehicle 110 by controlling the other components such as the one or more ESCs 318, e.g., by providing instructions to have each ESC 318 speed up or slow down motors. The flight controller 315 may include software stored in a non-volatile memory and executed by one or more hardware processors, a field-programmable gate array (FPGA), and/or an application-specific integrated circuit (ASIC). The flight controller 315 of the EC system 300 may communicate with a remote device (e.g., the remote controller 120) through the communication subsystem 310. The ESC 318 may be configured to interface with the thrust motors 140 (via electronic interfaces) to control the speed and thrust applied to the propellers 145 of the aerial vehicle 110.

The sensor subsystem 320 includes a plurality of sensors for determining the current state, position, and/or orientation of the aerial vehicle 110. The sensor subsystem 320 includes a compass 322, an inertial measurement unit (IMU) 324, and a Global Navigation Satellite System (GNSS) receiver 326. The sensor subsystem 320 may also include sensors for detecting a current power level of a battery that powers the aerial vehicle 110, the current temperature of an element of the aerial vehicle 110, mechanical malfunction (e.g., malfunction of a thrust motor 140), electrical failures (e.g., a battery that is producing excessive or insufficient current or voltage or excessively fast drain of battery charge), and software errors (e.g., an uncaught exception in a process being executed). The sensor subsystem 320 may also include object detection sensors (e.g., sonar, radar, lidar, laser rangefinders, and/or cameras capturing images process object detection software).

The compass 322 may include one or more magnetometer sensors with which it measures the earth's magnetic field to determine the orientation (e.g., the heading with respect to polar north) of the aerial vehicle 110. The compass 322 may include a vector magnetometer, which may measure the strength of a magnetic field, the declination (the angle between the horizontal component of the field vector and magnetic north), and the inclination (the angle between the field vector and the horizontal surface). In some embodiments, the magnetometer is a triple-axis magnetometer. The compass 322 may determine the orientation (e.g., the yaw, pitch, and/or roll) of the aerial vehicle 110 based on the measured magnetic field vector and based on calibration values. Determining the orientation of the aerial vehicle 110 may include determining a single angle (e.g., the yaw or the heading of the aerial vehicle 110 with respect to north) or determining two angles (e.g., the heading and the inclination). The compass 322 may interoperate with the IMU 324 to determine the full 3-dimensional orientation of the aerial vehicle 110. The compass 322 may be fixed on the aerial vehicle 110 so that when the aerial vehicle 110 rotates, the compass 322 also rotates equivalently. To determine the orientation of the aerial vehicle 110 based on the raw magnetic field sensor data measured by the magnetometer sensors of the compass 322, the compass 322 generally must first be calibrated. Based on calibration values, the compass 322 may convert a raw magnetic field vector, represented herein as ($M_x$, $M_y$, $M_z$), which was measured by the magnetometer of the compass 322 into a normalized (calibrated) field vector ($M_{xn}$, $M_{yn}$, $M_{zn}$). Calibration of the magnetometer of the compass 322 is discussed further below. The compass 322 may determine the orientation of the aerial vehicle 110 by comparing the normalized (calibrated) field vector ($M_{xn}$, $M_{yn}$, $M_{zn}$) to a known direction of the magnetic field at that position on Earth.

The IMU 324 may include one or more accelerometers (angular and/or linear) and one or more gyroscopes for determining the specific force (i.e., the net non-gravitational acceleration) and the angular rate (i.e., the rate of change of the orientation) of the aerial vehicle 110. The IMU 324 may include linear accelerometers, one for each position axis. The IMU 324 or a computing system coupled thereto may also estimate the velocity, position, and orientation of the aerial vehicle 110 based on detected sensor data and dead reckoning. In some example embodiments, the compass 322 is part of the IMU 324. The compass 322 and the IMU 324 may interoperate to determine the orientation (yaw, pitch, and roll) of the aerial vehicle 110.

The GNSS receiver 326 detects signals from satellites in a GNSS system, such as GPS, GLONASS, BeiDou-2, and/or Galileo. The GNSS receiver 326 may be a single-frequency receiver that detects signals from a single satellite constellation (e.g., the GPS satellite constellation) or may be a multi-frequency receiver that detects signals from multiple satellite navigation systems. The GNSS receiver 326 may determine the location of the aerial vehicle 110 based on the relative delays of the received signals produced by a constellation of satellites. The determined location may be, for example, a global longitude and latitude. In some example embodiments, the GNSS receiver 326 may be a GPS receiver that uses assisted GPS (A-GPS) to improve the speed of signal acquisition at startup. The communication system 310 of the aerial vehicle 110 may receive external GPS data to assist in satellite acquisition from an external device (e.g., the remote controller 120, a smartphone, a laptop computer, or a tablet computer) communicatively coupled to the aerial vehicle 110 or from a cellular tower. In alternate embodiments, the GNSS receiver 326 may employ an analogous signal acquisition assist system with a GNSS other than GPS.

In some example embodiments, the sensor subsystem 320 may include one or more barometers to detect the atmospheric pressure around the aerial vehicle 110, which may be used to determine the altitude (or a relative altitude) of the aerial vehicle 110. In some example embodiments, the sensor subsystem 320 may include duplicate sensors (e.g., one or more duplicate accelerometers and gyroscopes of the IMU 324, compasses 322, and/or a barometers), which may be placed in the aerial vehicle 110 so as to provide location diversity.

The sensor subsystem 320 may include a visual position module that determines, based on input from a camera (e.g., camera 115), the position of various objects (e.g., buildings, trees, people, or any object) in the visual scene captured by the camera. The visual position module may include an optical flow module for tracking objects. The optical flow module may receive rotation and velocity information for the aerial vehicle from the IMU 324 to determine apparent motion of objects resulting from movement and rotation of the aerial vehicle 110 to augment tracking and position determination of visual objects.

Figure 5A:
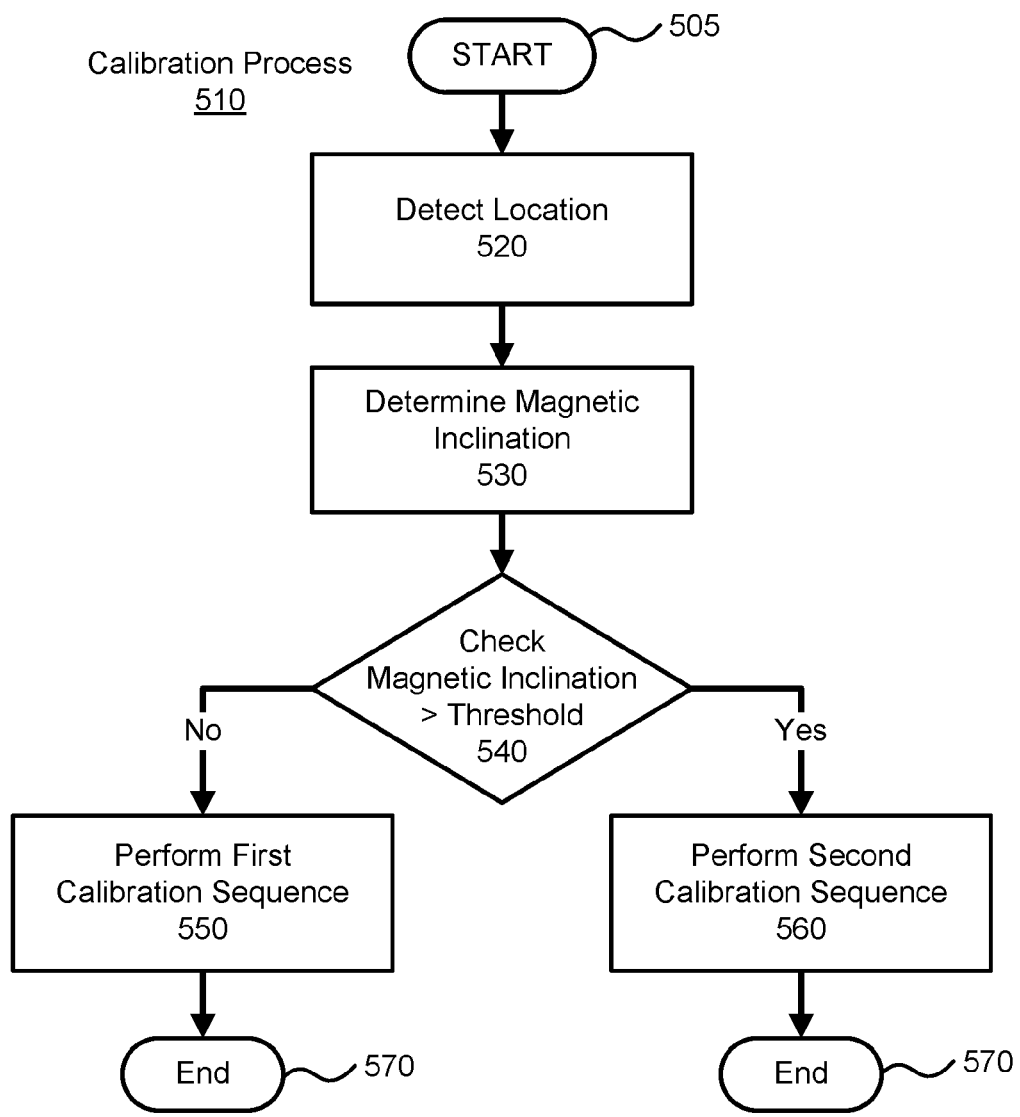
FIG. 5A illustrates a flow diagram for an example process for calibrating a magnetometer compass.

The compass calibration module 340 may receive inputs from the compass 322, the IMU 324, and the GNSS receiver 326 during a calibration procedure to determine calibration values for the compass 322. The compass calibration module 340 may be a set of software instructions stored in a non-volatile memory and executed by one or more computer processors on the aerial vehicle 110 or logic embodied in an field-programmable gate array (FPGA) or an application-specific integrated circuit (ASIC). The compass calibration module 340 is further described below in conjunction with FIG. 3B and an example process that may be executed by the compass calibration module 340 is illustrated in FIG. 5A.

The power subsystem 350 may include a battery pack, a protection circuit module, a power control, and/or battery management system. The power subsystem 350 may be configured to manage and supply power each of the components of the EC system 300. The power subsystem 350 may also provide power to devices coupled to the aerial vehicle 110, such as the gimbal 175 and the camera 115.

The gimbal interface 360 provides for communicative coupling with the gimbal 175. The gimbal interface 360 may, in some example embodiments, receive position information from sensors (e.g., one or more IMUs, one or more compasses, or rotary encoders on the motors) on the gimbal 175. The gimbal interface 360 may control the motors of the gimbal 175 to stabilize the camera 115 based on the received position information.

The camera interface 370 may interface with an image capture device (e.g., camera 115) or may include an integrated image capture device. The integrated image capture device may be positioned similarly to the camera frame 210 illustrated in FIG. 2. The flight controller 315 also may interface with the video link controller 375 for operation control of an image capture device (e.g., camera 115) coupled to the aerial vehicle 110. The video link controller 375 may be configured to communicate with the camera interface 370 to capture and transmit images from an image capture device to a receiving device (e.g., the remote controller 120, or another device with a screen such as a smartphone), e.g., via the communication subsystem 310. On a display screen (e.g., screen 170) of the receiving device, the video may be overlaid and/or augmented with other data from the aerial vehicle 110 such as the telemetric (or sensor) data from the sensor subsystem 320.

Figure 3B:
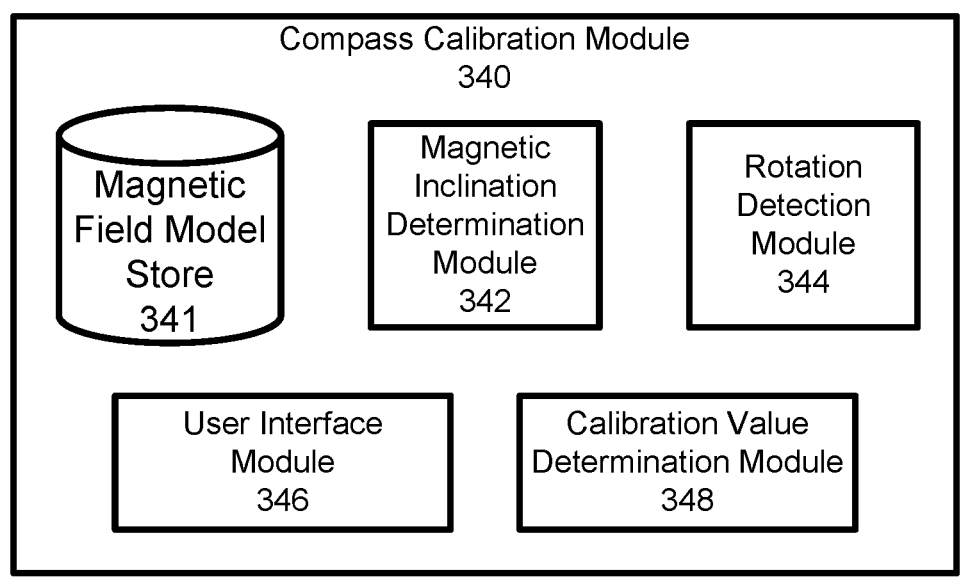
FIG. 3B illustrates an example of a compass calibration module.

FIG. 3B illustrates a compass calibration module 340 that may be part of an aerial vehicle 110. The compass calibration module 340 may include a magnetic field model store 341, a magnetic inclination determination module 342, a rotation detection module 344, a user interface module 346, and a calibration value determination module 348. Although FIGS. 3A-3B illustrate the compass calibration module 340 as being part of the aerial vehicle 110, in alternate embodiments, some or all of the elements of the compass calibration module 340 and the functions attributed thereto may be performed by an external device. For example, a remote controller 120 or similar device may implement the compass calibration process described herein by receiving the output of the compass 322 and/or the IMU 324 through the communication subsystem 310.

The magnetic field model store 341 is a non-volatile data storage medium that stores a model of the earth's magnetic field. The magnetic field model store 341 may be part of a larger memory on the aerial vehicle 110. The stored magnetic field model may be a global model such as the World Magnetic Model (WMM), the International Geomagnetic Reference Field (IGRF), or the global magnetic model produced by the Goddard Space Flight Center and the Danish Space Research Institute. In an example embodiment in which the stored magnetic field model is that of the WMM, the magnetic field model store 341 may contain the coefficient file published by the National Geophysical Data Center (NGDC) and software for determining the magnetic field based on the coefficient file.

The magnetic field model may be updated by downloading an updated version. The updated version may be downloaded via an intermediate device that enables the aerial vehicle 110 to access the internet. The intermediate device may be, for example, a PC, a mobile device (e.g., a smartphone or tablet computer), a wireless (e.g., Wi-Fi) router, a wireless hotspot, or the remote controller 120 in embodiments where the remote controller 120 may connect to the internet. The aerial vehicle 110 may connect to the intermediate device wirelessly (e.g., through the communication subsystem 310) or via a wired connection (e.g., a USB connection). Responsive to being connected to the internet, the aerial vehicle 110 may send a request to a server (e.g., a server associated with a particular Uniform Resource Locator (URL)) for an indication as to whether an updated magnetic field model is available for download. If an updated magnetic field model is available, download of the updated magnetic field model may begin automatically or may be initiated by a user interaction with the aerial vehicle 110, the remote controller 120, or the external device.

In some embodiments, an external device (e.g., a PC, a mobile device (e.g., a smartphone or tablet computer), or the remote controller 120) connects to the internet and determines, by querying a server, whether an updated magnetic field model is available for download. If available, the external device may download the updated magnetic field model and push the updated model to the aerial vehicle 110 at a later time (e.g., when the external device next connects to the aerial vehicle 110). The updated model may be wirelessly transferred from the external device to the aerial vehicle 110 through the communication subsystem 310 of the aerial vehicle 110. In some embodiments, the external device may indicate to a user (e.g., by displaying an indication on the screen 170 of the remote controller 120) that the magnetic field model should be updated in response to a determination that the magnetic field model has not been updated within a certain period of time (e.g., within a few years) or when an updated magnetic field model is expected to have become available according to some update schedule.

The magnetic inclination determination module 342 is a software or hardware logic module that determines the magnetic inclination $\phi_M$ at the current geographic location of the aerial vehicle 110. The magnetic inclination determination module 342 may receive the current location of the aerial vehicle 110 as determined by the GNSS receiver 326 and the magnetic field model from the magnetic field model store 341 as inputs. The output of the magnetic inclination determination module 342 may be the angle of the inclination $\phi_M$ of the magnetic field at the current location of the aerial vehicle 110. In an example embodiment in which the magnetic field model is that of the WMM, the magnetic inclination determination module 342 may determine the inclination $\phi_M$ of the earth's magnetic field at the present location by executing the software published by the National Geophysical Data Center (NGDC) or some derivative thereof. In some embodiments, the magnetic inclination determination module 342 determines the absolute value of the magnetic inclination (i.e., $|\phi_M|$).

The magnetic inclination determination module 342 may also determine if the magnetic inclination $\phi_M$ is greater than a threshold $\phi_T$ (e.g., $\phi_T=73°$). The calibration process for the compass 322 that is performed may depend on whether the magnetic inclination $\phi_M$ is greater than the threshold $\phi_T$. As will be apparent to one skilled in the art, in alternate embodiments the magnetic inclination determination module 342 may determine that the magnetic inclination $\phi_M$ is greater than a threshold $\phi_T$ without directly comparing the two quantities by performing a logically equivalent comparison. For example, if the magnetic inclination determination module 342 determines, based on the magnetic field model, that the magnetic field vector in a Cartesian coordinate system is $(B_x, B_y, B_z)$, it may be determined that the absolute value of the magnetic inclination $\phi_M$ is greater than a threshold $\phi_T$ by determining that $\tan^2(\phi_T)(B_x^2+B_y^2)>B_z^2$.

The rotation detection module 344 is a software or hardware logic module that detects that the aerial vehicle 110 (and thus the compass 322) has been moved through a rotation path. Herein, the term "rotation path" refers to the orientations that an object (e.g., the aerial vehicle 110, the compass 322, or both) takes on over a period of time. During the time period corresponding to a rotation path of an object, the object may also traverse a position path (i.e., translation in space). For example, if a user holds an aerial vehicle 110 horizontally from their body and spins around, then the aerial vehicle 110 would move through a first rotation path (e.g., a rotation path about a vertical axis) and a position path (a circular path, also about a vertical axis). A rotation path can be described with respect to both an absolute coordinate system and a relative coordinate system defined in reference to the compass 322 and/or the aerial vehicle 110 (e.g., the principal axes of the aerial vehicle 110). For example, if the aerial vehicle 110 has a horizontal inclination (i.e., no pitch) and a flat bank (i.e., no roll) and moves through a rotation path about a vertical axis, the rotation path is also about the yaw axis of the aerial vehicle 110.

The rotation detection module 344 may use the output of the IMU 324 to detect the movement of the aerial vehicle 110 through a rotation path. The aerial vehicle 110 may be manually manipulated through the rotation path by a user holding it. The rotation detection module 344 may determine that the aerial vehicle 110 is oriented at a predefined initial position. The rotation detection module 344 may also determine whether the aerial vehicle 110 has been moved through a predefined rotation path. The rotation detection module 344 may associate a series of outputs from the compass 322 (e.g., detected magnetic field vectors) with a series of orientations (e.g., orientations relative to an initial position of the rotation path) detected by the IMU 324.

In some embodiments, the rotation detection module 344 determines whether the manner that a user rotated the aerial vehicle 110 sufficiently corresponds to a predetermined rotation path. For example, if the rotation detection module 344 determines, based on received data from the IMU 324, that while the aerial vehicle 110 was being rotated about the axis corresponding to a predetermined rotation path, it was also rotated in another direction, the rotation detection module 344 may determine whether data from the IMU 324 and the compass 322 can be processed to correct for divergence from the predetermined rotation path. In some embodiments, the rotation detection module 344 may determine whether to proceed with the data from a rotation of the aerial vehicle 110 by determining whether the orientation of the aerial vehicle 110 deviated from the predetermined rotation path by more than a threshold (e.g., 30°). If the rotation detection module 344 detects that a rotation of the aerial vehicle 110 does not sufficiently correspond to the rotation path, the rotation detection module 344 may cause the user interface module 346 to indicate an error to the user and/or an indication that the aerial vehicle 110 should again be rotated through a rotation path.

In some embodiments, the rotation detection module 344 determines a quality metric of the magnetic field measurements after magnetic field data is detected for a number of rotation paths (e.g., after the first two rotation paths detected by the rotation detection module 344). For example, if the variation of magnetic field measurements from a regression model is large, the compass calibration module 340 may output an indication to perform more rotation paths and conversely, if the variation of the magnetic field measurements from the regression model is small the compass calibration module 340 may complete calibration after measuring magnetic field data corresponding to fewer rotation paths. In some example embodiments, the number of rotations paths through which the aerial vehicle 110 is rotated may be based on the measured strength of the magnetic field.

In some embodiments, the rotation detection module 344 determines whether the magnetic field data measured during one or more rotation paths is adequate for calibrating the compass 322. For example, the rotation detection module 344 may determine whether the magnetic field data sufficiently constrains a regression model used to determine the calibration values. The rotation detection module 344 may determine whether the data is clustered rather than distributed around a circle. If the rotation detection module 344 determines that the data is not adequate for calibrating the compass 322, the rotation detection module 344 may cause the user interface module 346 to indicate an error to the user and/or an indication that the aerial vehicle 110 should again be rotated through one or more rotation paths. The portion of the calibration procedure corresponding to those or more rotation paths may then be repeated.

The user interface module 346 outputs indications to rotate the aerial vehicle 110 through rotation paths. In some embodiments, the user interface module 346 outputs these indications by sending instructions to one or more output devices to indicate to the user how to manipulate the aerial vehicle 110, that the aerial vehicle 110 was or was not manipulated correctly, and/or that an error occurred during the calibration process. An output device may be, for example, a screen (e.g., the screen 170 of the remote controller 120), one or more loudspeakers (e.g., a dynamic loudspeaker or a piezoelectric speaker, such as a beeper), one or more visual indicators (e.g., light emitting diodes (LEDs) or other light emitting device), or a tactile transducer (e.g., a vibration-producing haptic device). An output device may be on the aerial vehicle 110 or may be part of an external device (e.g., the remote controller 120) that the aerial vehicle 110 communicates with through the communication subsystem 310. The user interface module 346 may send instructions via the communication subsystem 310 to output particular indications. An example user interface that may be displayed on a screen is discussed further below and is illustrated in FIGS. 8A-8B.

An indication to rotate the aerial vehicle 110 through a rotation path may be displayed on a screen (e.g., the screen 170 of the remote controller 120) as text with instructions, a still image, an animation, and/or a video. Additionally or alternately, the indication may be sound (e.g., recorded verbal instructions, computer-generated speech, a beep, a beeping pattern, or some other audio cue), one or more illuminated LEDs (e.g., a particular illuminated LED of a set of LEDs, a pattern of illuminated LEDs, a flashing pattern of one or more LEDs), some other illuminated electric light, or any other type indication. In some embodiments, the user interface module 346 outputs indications on both the aerial vehicle 110 (e.g., by illuminating one or more LEDs) and the remote controller 120 (e.g., as a visual indicator on the screen 170).

The calibration value determination module 348 calculates calibration values for the compass 322 based on the outputs from the compass 322 associated with the orientations detected by the IMU 324. The calibration values may be parameters for transforming a raw magnetic field vector ($M_x$, $M_y$, $M_z$) into a normalized field vector ($M_{xn}$, $M_{yn}$, $M_{zn}$). The calibration values may be parameters for applying a vector offset and/or a linear transformation to the magnetic field vector ($M_x$, $M_y$, $M_z$). Examples of calibration values are described further below. After the calibration values are calculated, they may be stored for use by the compass 322 to determine the orientation of the aerial vehicle 110.

Figure 4:
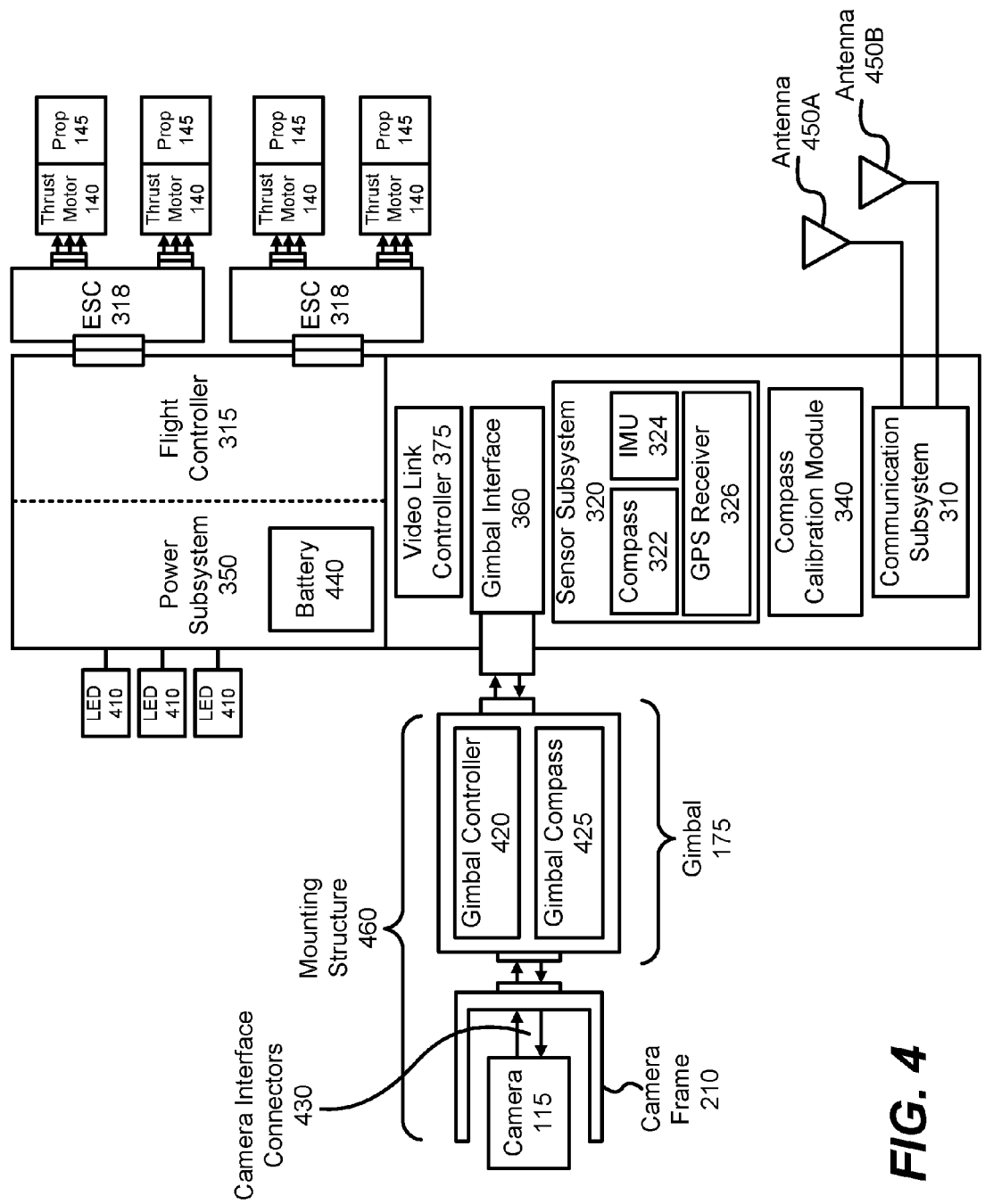
FIG. 4 illustrates an example interconnect architecture of a remote controlled aerial vehicle with a gimbal.

Turning to FIG. 4, it illustrates an example interconnect architecture of the aerial vehicle 110 with the gimbal 175. This example embodiment may include the components illustrated and described in the prior figures, e.g., FIG. 3A. The aerial vehicle 110 may include visible light emission devices such as LEDs 410 on the aerial vehicle 110 that may be used to provide vehicle status related information. Also shown is a battery 440 as a part of the power subsystem 350 and two antennas 450A-450B as a part of the communication subsystem 310.

FIG. 4 illustrates, in an example embodiment, that the flight controller 315 may be coupled with two ESCs 318. Each ESC 318 in this configuration may drive two thrust motors 140 (via respective components of each thrust motor 140). The flight controller 315 may interface with the gimbal controller 420 through the gimbal interface 360 to control the gimbal 175.

Also shown is a gimbal interface 360 that may communicatively couple the gimbal controller 420 to components of the EC system 300. In particular, the gimbal interface 360 may be communicatively coupled with the video link controller 375, the sensor subsystem 320, and/or one or more of the antennas 450A-450B. The gimbal interface 360 may be used to feed data (e.g., telemetric data, control signals received from the remote controller 120, and/or video link control signals) from the video link controller 375, the sensor subsystem 320, and/or one or more of the antennas 450A-450B to the gimbal controller 420. The gimbal controller 420 may use this data to adjust the camera frame 210. It is noted that the camera frame 210 may be, for example, a camera holder frame to secure a camera 115. The gimbal controller 420 may be communicative coupled with the camera 115 through one or more camera interface connectors 430. The camera interface connectors 430 may include camera communication interfaces such as universal serial bus (USB) and/or HDMI. The media captured by the camera 115 (e.g., still images, video, and/or audio) may be communicated to the aerial vehicle 110 through the camera interface connectors 430. Data (e.g., telemetric data from the sensor subsystem 320) also may be sent via the camera interface connectors 430 to the camera 115 to associate with video captured and stored on the camera 115.

In some embodiments, the gimbal interface 360 may perform functions attributed herein to the gimbal controller 420. For example, the gimbal interface 360 may set a position for each motor in the gimbal 175 and/or determine a current position for each motor of the gimbal 175 based on signals received from one or more rotary encoders.

In one example aspect, the aerial vehicle 110 includes a mounting structure 460. In one example embodiment, the mounting structure 460 may be removably attachable with the aerial vehicle 110 and may be structured to operate as a standalone mount. Continuing with the example embodiment, the mounting structure 460 may include a three-axis gimbal (e.g., gimbal 175) and a camera frame 210. The three-axis (e.g., x, y, and z axis) gimbal (e.g., gimbal 175) may include the gimbal controller 420, a gimbal compass 425, and/or an IMU sensor. The camera frame 210 may secure a camera, e.g., the camera 115.

When a camera (e.g., camera 115) couples with the mounting structure 460, the gimbal controller 420 may be able to rotate the attached camera 115 in all directions. The gimbal controller 420 may be capable of precisely measuring rotational angles (e.g., roll, pitch and yaw). The gimbal 175 may include a gimbal compass 425 (e.g., a compass with one or more magnetometer sensors). The aerial vehicle 110 also may include a compass 322 and/or an IMU sensor. When coupled with the aerial vehicle 110, the gimbal compass 425 and the compass 322 may interact for calibration. An IMU in the gimbal 175 and an IMU 324 in the aerial vehicle 110 may also interact for calibration of the compass 322. For example, calibration parameters from the gimbal compass 425 may be transferred to the compass 322 of the aerial vehicle 110.

It is noted that in an alternate aspect, the gimbal 175 may use rotary encoders (rotary encoders are, for example, conductive, optical, and/or magnetic) in addition to, or rather than, an IMU sensor. For example, when coupled with the aerial vehicle 110, readings from the gimbal compass 425, IMU, and/or rotary encoders from gimbal axes may be compared with the compass 322 and IMU readings of the aerial vehicle 110 for calibration.

The compass 322 of the aerial vehicle 110 may include a magnetometer that can measure magnetic field in three dimensions. Values read from a magnetometer may be represented as a three-dimensional vector $[M_x, M_y, M_z]$. When rotated in all directions, magnetometer measurements ideally describe a sphere centered at (0, 0, 0). That is, suppose an idealized compass is placed in a constant magnetic field but is otherwise not in the presence of interference. If the magnetic field at the location of the compass 322 is represented by a polar coordinate vector $B=(\|B\|, \theta, \phi)$ where $\|B\|$ is the magnitude of the magnetic field (e.g., in Tesla) and $\theta$ and $\phi$ are angles specifying the direction of the field (e.g., $0° \leq \theta < 360°$, $-90° \leq \phi < 90°$), then the compass 322, when rotated to any orientation $(\theta', \phi')$, will measure a magnetic field of $B' = (\|B\|, \theta+\theta', \phi+\phi')$. Thus, the compass 322, when rotated to every direction, may measure a "sphere" centered (0, 0, 0) with a radius of $\|B\|$.

Compasses (e.g., the gimbal compass 425 and/or the compass 322 of the aerial vehicle 110) may be calibrated for hard-iron and/or soft-iron interference. Hard-iron interference may be caused by permanent magnets or magnetized iron/steel that are in the vicinity of the magnetometer of a compass. Hard-iron interference may be caused be external sources. Hard-iron interference may shift the center of the sphere described by $(M_x, M_y, M_z)$ measurements away from (0, 0, 0). Soft-iron interference may be caused by internal factors such as current carrying traces on a printed circuit board (PCB) that includes the magnetometer. Soft-iron interference distorts the sphere such that full round rotation circles may have approximately ellipsoidal shape.

The relationship between the normalized (calibrated) values $(M_{xn}, M_{yn}, M_{zn})$ and raw sensor measurements $(M_x, M_y, M_z)$ may be expressed as follows:

$$\begin{bmatrix} M_{xn} \\ M_{yn} \\ M_{zn} \end{bmatrix} = [M_m]_{3\times 3} \begin{bmatrix} \frac{1}{M_{scx}} & 0 & 0 \\ 0 & \frac{1}{M_{scy}} & 0 \\ 0 & 0 & \frac{1}{M_{scz}} \end{bmatrix} [M_{si}]_{3\times 3}$$

$$\begin{bmatrix} M_x - M_{osx} \\ M_y - M_{osy} \\ M_z - M_{osz} \end{bmatrix} = \begin{bmatrix} MR_{11} & MR_{12} & MR_{13} \\ MR_{21} & MR_{22} & MR_{23} \\ MR_{31} & MR_{32} & MR_{33} \end{bmatrix} \begin{bmatrix} M_x - MR_{10} \\ M_y - MR_{20} \\ M_z - MR_{30} \end{bmatrix}$$

Here, $M_{sck}$ may be scale factors, $M_{osk}$ are offsets for hard-iron distortion (k being x, y, or z), and $M_{si}$ may be a matrix that describes soft-iron distortion. In one example aspect, a goal of compass calibration may be to determine $MR_{10}$ to $MR_{33}$ so that normalized values may be obtained from raw measurements. It is noted that an aerial vehicle may be designed to minimize soft-iron interference by placing magnetometers away from potential magnetic sources. Hence, the compasses (e.g., the compass 322 or the gimbal compass 425) may be calibrated for hard-iron interference using least squares sphere fitting based on, for example, a couple hundred measurements. Calibration values may be stored in a non-volatile memory of the aerial vehicle 110.

When the aerial vehicle 110 is readied for flight, it may run an automated calibration check process. An automatic pre-flight check may be configured to detect calibration issues by comparing outputs of two or more magnetometer readings. If calibration issues are detected, the user may be prompted (e.g., via the screen 170 of the remote controller 120) to begin a calibration process. The pre-flight check may also determine that calibration should be performed based on a flag stored in memory that a crash occurred during a prior flight, a determination based on the output of the GNSS receiver 326 that the geographic distance between the current location and the last location that the compass 322 was calibrated at is large (e.g., greater than a threshold), or that the compass 322 has not been calibrated in a long time (e.g., a time greater than a threshold amount of time). The pre-flight check may also determine that calibration should be performed in response to detecting that a new device is connected to the aerial vehicle 110 which may result in interference. As an additional check, the gimbal 175 may be automatically commanded to orient in such a way that gimbal compass 425 is aligned with the compass 322. The values measured by the magnetometers (e.g., geographic directions, magnetic field directions, and/or magnetic field strengths) of the compass 322 of the aerial vehicle 110 and gimbal compasses 425 may be directly compared to check if they match. A mismatch may provide an indication of a bad calibration.

Calibration Processes

FIG. 5A illustrates a flow diagram for an example process for calibrating a magnetometer compass (e.g., compass 322). The calibration process 510 may be performed electronically by executing a set of software instructions with one or more hardware processors (e.g., hardware processors on the aerial vehicle 110). The one or more processors may interface with sensor interfaces that receive and process data from electronic sensors (e.g., sensors of the sensor subsystem 320). The calibration process 510 may be performed by the compass calibration module 340. The calibration process 510 may start 505 by detecting 520 the location of the aerial vehicle 110. The location of the aerial vehicle 110 may be detected 520 by the GNSS receiver 326. In an alternate embodiment, a remote controller 120 includes a GNSS receiver and detects its location instead.

Based on the detected location of the aerial vehicle 110, the magnetic inclination may be determined 530. The magnetic inclination determination module 342 may determine 530 the magnetic inclination. The magnetic inclination may be determined by a magnetic field model from the magnetic field model store 341.

The determined magnetic inclination is checked 540 to determine whether it is greater than a threshold. The threshold may be predetermined (e.g., set to a value), for example, 73° (1.27 radians). In response to this determination, one of two calibration sequences may be performed. A first calibration sequence may be performed 550 if the absolute magnetic inclination is not greater than the threshold and a second calibration sequence may be performed 560 if the magnetic inclination is greater than the threshold. The first calibration sequence 550 may include rotating the aerial vehicle horizontally (about a vertical axis of rotation) and the second calibration sequence 560 may include rotating the aerial vehicle vertically (about a horizontal axis of rotation). Herein, "vertical" refers to the direction parallel with the direction of gravity. The IMU 324 may determine the vertical direction by detecting the direction gravity. Herein, "horizontal" refers to directions perpendicular to the vertical direction.

FIG. 5B illustrates a flow diagram for an example first calibration sequence. The first calibration sequence 550 may be performed responsive to a determination that the absolute value of the magnetic inclination of the earth's magnetic field is less than a threshold value.

The first calibration sequence may start 551 by outputting 552 an indication to rotate the aerial vehicle 110 through a first rotation path. Output 552 of the indication may be controlled by the user interface module 346. The first rotation path may be a horizontal, i.e., it may correspond to a rotation about a vertical axis.

Next, first magnetic field data may be measured 553 by detecting a magnetic field through the first rotation path. The first magnetic field data may be measured 553 by the magnetometer of the compass 322 and the rotation of the aerial vehicle 110 may be detected by the IMU 324 of the aerial vehicle 110. The rotation detection module 344 may associate data detected by the magnetometer of the compass 322 with the rotation data detected by the IMU 324. The rotation detection module 344 may determine when the first rotation path has been completed and whether the manner that a user rotated the aerial vehicle 110 sufficiently corresponds to the first rotation. The first rotation path may be about a vertical axis (i.e., an axis parallel with the direction of gravity). The first rotation path may be, for example, a horizontal rotation about the yaw axis of the aerial vehicle 110. An example of a first rotation path is described below in conjunction with FIG. 6A.

After the aerial vehicle 110 has been rotated through the first rotation path, an indication to rotate the aerial vehicle 110 through a second rotation path is output 554. The second rotation path may be about a vertical axis, like the first rotation path, but may be about a different axis with respect to the aerial vehicle 110. The axes of rotation with respect to the aerial vehicle 110 of the first and second rotation paths may be orthogonal in some embodiments. The indication to rotate through the second rotation path may be similar to that of the first rotation path, but the indications may have differences that enable a user to distinguish between the two indications.

Second magnetic field data may be measured 555 through the second rotation path. As with the first rotation path, the rotation detection module 344 may determine when the second rotation has been completed and whether the manner that a user rotated the aerial vehicle 110 sufficiently corresponds to the second rotation. The rotation detection module 344 may associate data measured by the magnetometer of the compass 322 while the aerial vehicle 110 was rotated through the second rotation path with the rotation data detected by the IMU 324. The second rotation path may be, for example, a horizontal rotation about the roll axis of the aerial vehicle 110. An example of the second rotation path is described below in conjunction with FIG. 6B.

After the second magnetic field data has been measured 555, calibration values may be determined 556. The calibration values may be determined 556 based on the first and second magnetic field data. These calibration values may be stored in a non-volatile memory of the aerial vehicle 110 and may be used subsequently with the raw output of the magnetometer of the compass 322 to determine the orientation of the aerial vehicle 110. In some embodiments, the calibration value determination module 348 determines 556 the calibration values. After calibration values have been determined 556, the calibration process 510 may terminate. Upon termination of the calibration process 510, an indication (e.g., sound, one or more illuminated LED 410, and/or a visual indicator on the screen 170 of the remote controller 120) may be output to the user that the calibration process 510 has been completed.

FIG. 5C illustrates a flow diagram for an example second calibration sequence. The second calibration sequence 560 may be performed responsive to a determination that the absolute value of the inclination of the earth's magnetic field is greater than a threshold value. The second calibration sequence 560 is similar to the first calibration sequence 550 in that it includes outputting indications of rotation paths and then measuring magnetic field data through these rotation paths. Specifically, the second calibration sequence 560 includes outputting 562, 564, 566 respective indications to rotate through third, fourth, and fifth rotation paths and measuring 563, 565, 567 third, fourth, and fifth magnetic field data through the respective rotation paths. Subsequently, calibration values 568 may be determined based on the measured third, fourth, and fifth magnetic field data.

The axes of the rotation paths of the second calibration sequence 560 may be different than those of the first calibration sequence 550. For example, the first and second rotation paths of the first calibration sequence 550 may be horizontal (i.e., about a vertical axis) and the third, fourth, and fifth rotation paths of the second calibration sequence 560 may be vertical rotations (i.e., about horizontal axes). The third, fourth, and fifth rotation paths rotate about different horizontal axes or about the same horizontal axis. Each of the third, fourth, and fifth rotation paths may be about different axes with respect to the aerial vehicle 110. For example, the rotation paths of the second calibration sequence may be rotations about the yaw, roll, and pitch axes, respectively.

Although the second calibration sequence 560 shown in FIG. 5C includes three rotation paths, in alternate embodiments, it includes a different number of rotation paths (e.g., two). In some example embodiments, the number of rotation paths which the user is instructed to perform is based on the calculation of a quality metric of magnetic field measurements determined by the rotation detection module 344.

Figure 6A:
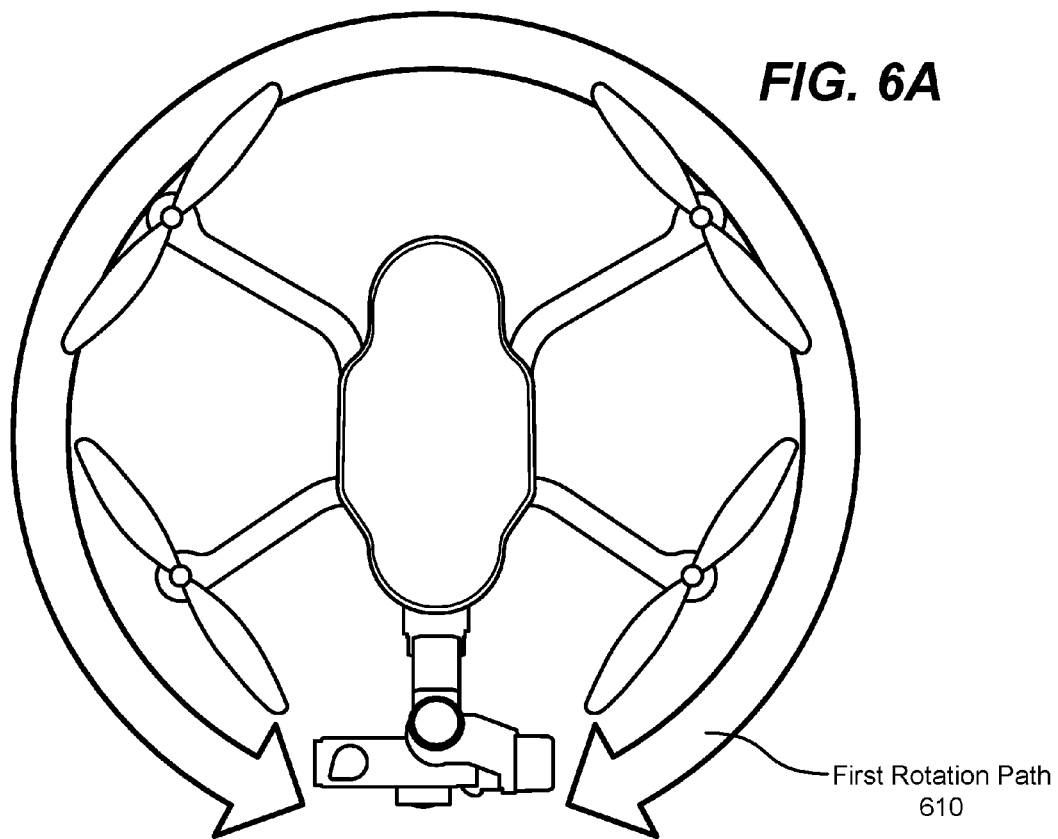
FIGS. 6A-6B respectively illustrate first and second rotational paths for an aerial vehicle in an example magnetometer calibration process.
Figure 6B:
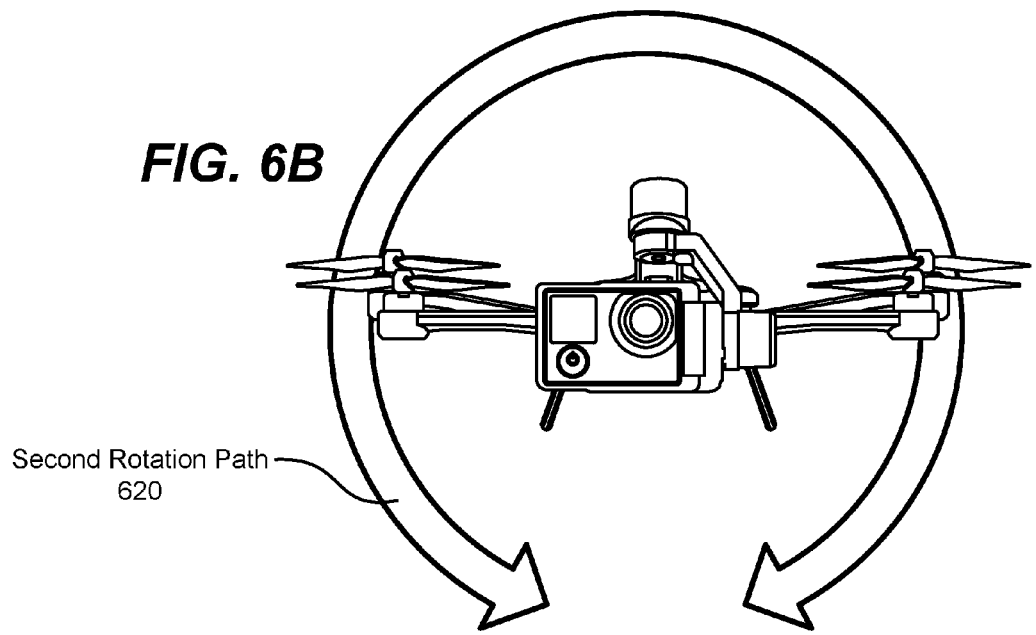

FIGS. 6A-6B respectively illustrate first and second rotational paths for the aerial vehicle 110 in an example magnetometer calibration process (e.g., calibration process 510). These figures illustrate a view from above of the aerial vehicle 110. FIG. 6A illustrates an example of the first rotation path 610 in which the first rotation path 610 is about the vertical axis and about the yaw axis of the aerial vehicle 110. FIG. 6B illustrates an example of the second rotation path 620 in which the second rotation path 620 is about the vertical axis and about the roll axis of the aerial vehicle 110. The first rotation path 610 and the second rotation path 620 may be full 360° rotations. In some example embodiments, the rotation detection module 344 may detect rotations that are either clockwise or clockwise. In alternate example embodiments, the rotations are restricted to a particular direction. The axes of rotation of the first rotation path 610 and the second rotation path 620 may both be vertical and may be orthogonal, relative to the aerial vehicle 110.

Figure 7A:
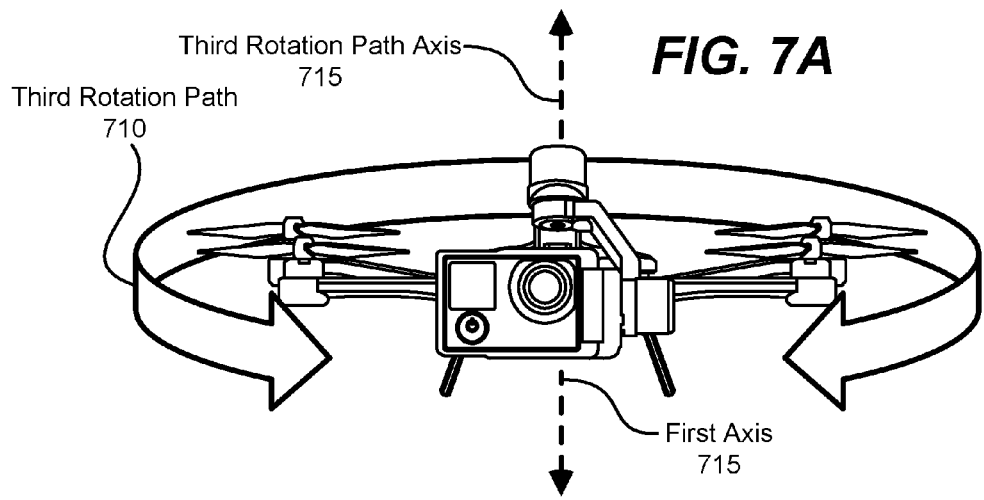
FIGS. 7A-7C respectively illustrate third, fourth, and fifth rotational paths for an aerial vehicle in an example magnetometer calibration process.
Figure 7B:
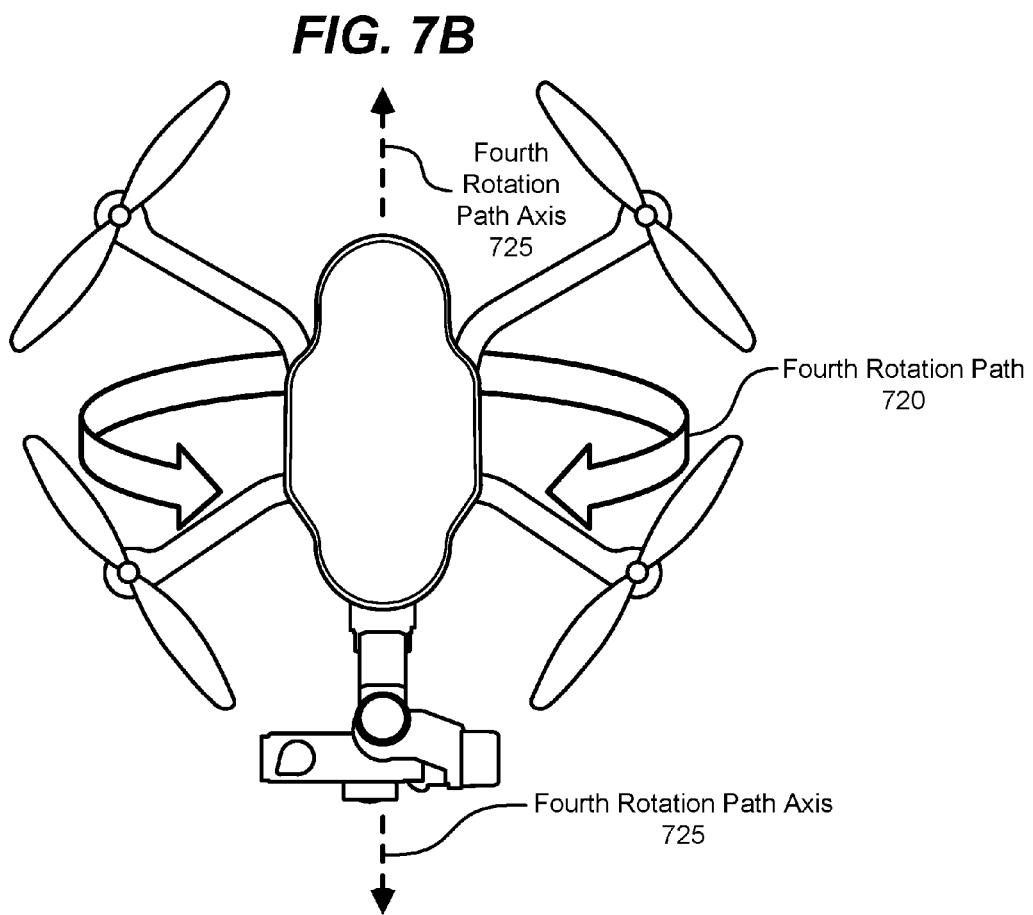
Figure 7C:
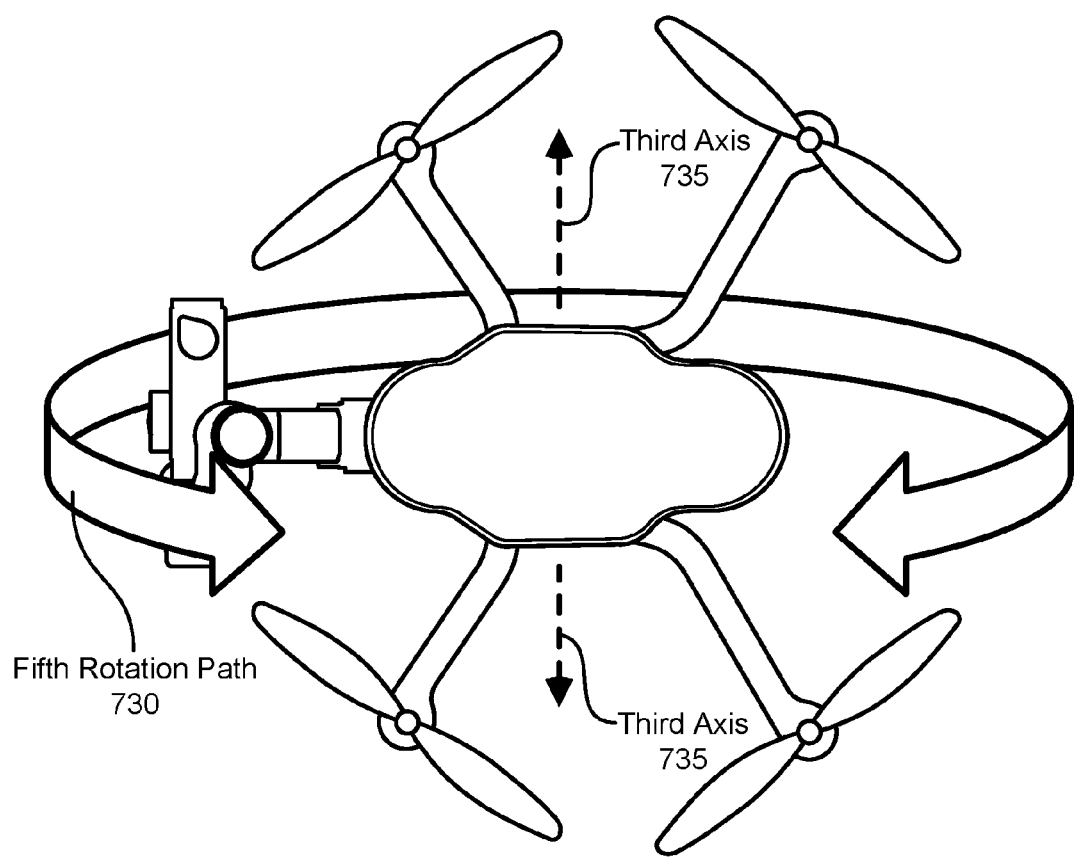

FIGS. 7A-7C respectively illustrate third, fourth, and fifth rotational paths for the aerial vehicle 110 in an example magnetometer calibration process (e.g., calibration process 510). These figures illustrate a view from above of the aerial vehicle 110. Each of the third, fourth, and fifth rotation paths may be rotations about horizontal axes.

FIG. 7A illustrates an example of the third rotation path 710 about a third rotation path axis 715. The third rotation path axis 715 may be a horizontal axis which corresponds to the yaw axis of the aerial vehicle 110. FIG. 7B illustrates an example of the fourth rotation path 720 about a fourth rotation path axis 725. The fourth rotation path axis 725 may be a horizontal axis which corresponds to the roll axis of the aerial vehicle 110. FIG. 7C illustrates an example of the fifth rotation path 730 about a fifth rotation path axis 735. The fifth rotation path axis 735 may be a horizontal axis which corresponds to the pitch axis of the aerial vehicle 110. The third rotation path axis 715, the fourth rotation path axis 725, and the fifth rotation path axis 735 may all be vertical rotations that, relative to the aerial vehicle 110, are mutually orthogonal.

It is noted that the rotation paths illustrated FIGS. 6A-6B and 7A-7C are included herein as examples. In alternate example embodiments, the first calibration sequence 550 and the second calibration sequence 560 include different rotation paths and/or rotation paths in a different order.

FIGS. 8A-8B illustrate an example user interface indicating instructions for calibrating the compass of an aerial vehicle (e.g., the compass 322 of the aerial vehicle 110). The user interface may be displayed on an electronic screen (e.g., screen 170) of an external device (e.g., the remote controller 120 or any other device with a screen capable of wirelessly coupling to the aerial vehicle 110). FIGS. 8A-8B illustrate a first screen 810 and a second screen 820 of the user interface at different times.

The first screen 810 of the user interface illustrated in FIG. 8A includes an initial position graphical indication 812 and an initial position text indication 814. The initial position graphical indication 812 may be an image showing a user how to hold the aerial vehicle 110. The initial position text indication 814, which in FIG. 8A includes the text "hold UAV level with nose pointing away from you," also may indicate to the user how to hold the aerial vehicle 110 in the initial position. In some embodiments, the first screen 810 is displayed until the IMU 324 of the aerial vehicle 110 detects that the aerial vehicle 110 is in the initial position.

In some embodiments, the second screen 810 is displayed after the IMU 324 of the aerial vehicle 110 detects that the aerial vehicle 110 is in the initial position. The second screen 820 of the user interface illustrated in FIG. 8A includes a rotation graphical indication 812 and a rotation text indication 824. The rotation graphical indication 822 may illustrate a rotation path (e.g., the first rotation path 610) for the user to perform. In the example of the second screen 820, the rotation graphical indication 822 indicates that the aerial vehicle 110 should be rotated about its yaw axis. The rotation text indication 824, which in FIG. 8B includes the text "keep UAV level while rotating horizontally in a full circle," indicates to the user how to rotate the aerial vehicle 110 through a rotation path.

Example Camera Architecture

Figure 9:
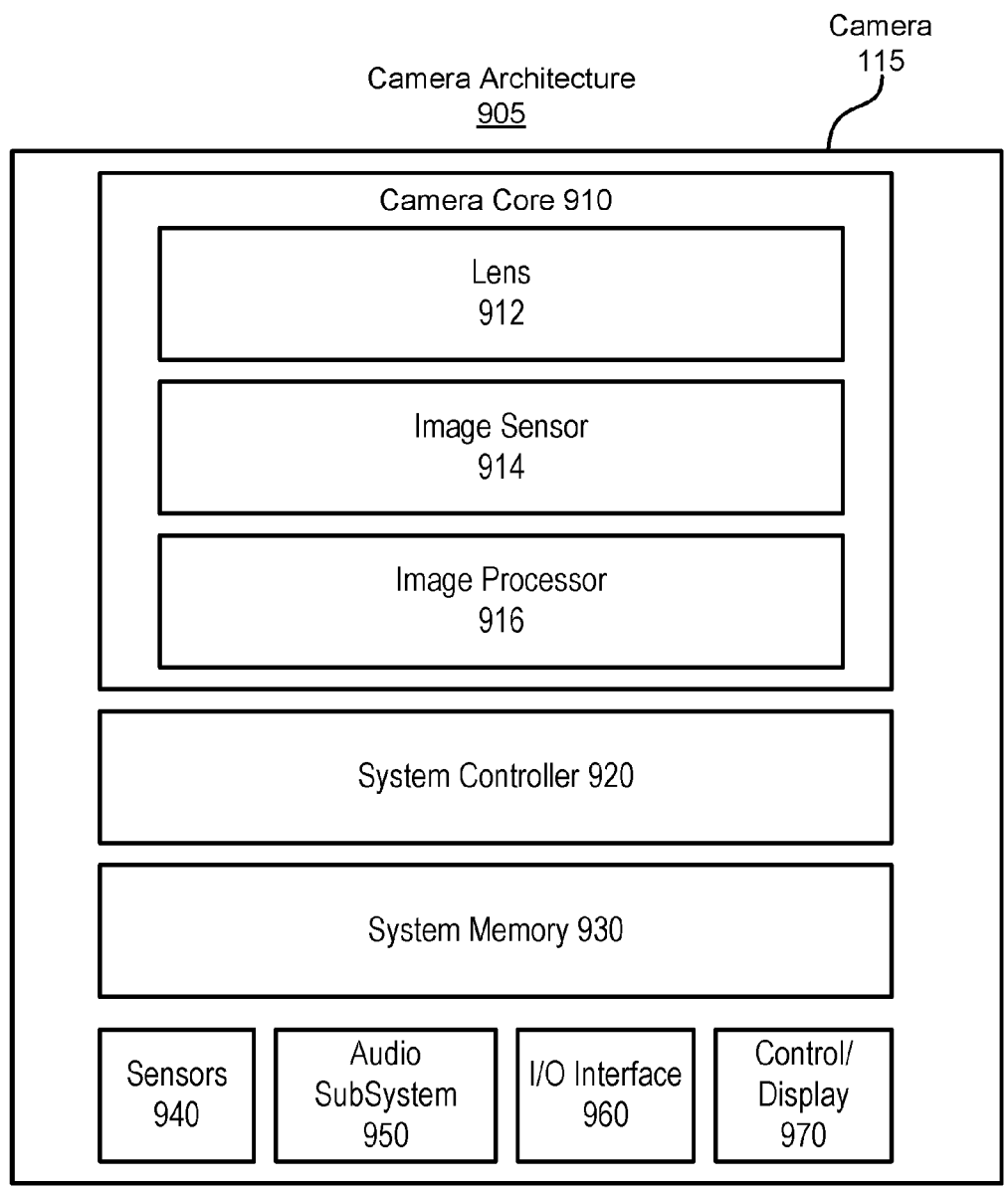
FIG. 9 illustrates a block diagram of an example camera architecture.

FIG. 9 illustrates a block diagram of an example camera architecture. The camera architecture 905 corresponds to an architecture for the camera, e.g., the camera 115. Briefly referring back to the camera 115, it may include a camera body, one or more a camera lenses, various indicators on the camera body (such as LEDs and/or displays), various input mechanisms (such as buttons, switches, and touch-screen mechanisms), and electronics (e.g., imaging electronics, power electronics, and/or metadata sensors) internal to the camera body for capturing images via the one or more lenses and/or performing other functions. In one example embodiment, the camera 115 may be capable of capturing spherical or substantially spherical content. As used herein, spherical content may include still images or video having spherical or substantially spherical field of view. For example, in one embodiment, the camera 115 may capture video having a 360° field of view in the horizontal plane and a 180° field of view in the vertical plane. Alternatively, the camera 115 may capture substantially spherical images or video having less than 360° in the horizontal direction and less than 180° in the vertical direction (e.g., within 10% of the field of view associated with fully spherical content). In other embodiments, the camera 115 may capture images or video having a non-spherical wide angle field of view.

As described in greater detail below, the camera 115 may include sensors 940 to capture metadata associated with video data, such as timing data, motion data, speed data, acceleration data, altitude data and/or GPS data. In a particular embodiment, location and/or time centric metadata (e.g., geographic location, time, and/or speed) can be incorporated into a media file together with the captured content in order to track the location of the camera 115 over time. This metadata may be captured by the camera 115 itself or by another device (e.g., a mobile phone and/or the aerial vehicle 110 via the camera interface connectors 430) proximate to the camera 115. In one embodiment, the metadata may be incorporated with the content stream by the camera 115 as the spherical content is being captured. In another embodiment, a metadata file separate from the video file may be captured (by the same capture device or a different capture device) and the two separate files may be combined or otherwise processed together in post-processing. It is noted that these sensors 940 may be in addition to the sensors of the sensor subsystem 320. In embodiments in which the camera 115 is integrated with the aerial vehicle 110, the camera 115 may not have separate individual sensors 940, but may rather rely upon the sensor subsystem 320 integrated with the aerial vehicle 110 and/or sensors of the gimbal 175.

Referring now to the details of FIG. 9, it illustrates a block diagram of the camera architecture 905 of the camera 115, according to one example embodiment. In the illustrated embodiment, the camera 115 includes a camera core 910 that includes a lens 912, an image sensor 914, and an image processor 916. The camera 115 may include a system controller 920 (e.g., a microcontroller or microprocessor) that controls the operation and functionality of the camera 115. The camera 115 also may include a system memory 930 that is configured to store executable computer instructions that, when executed by the system controller 920 and/or the image processors 916, may perform the camera functionalities described herein. In some example embodiments, a camera 115 may include multiple camera cores 910 to capture fields of view in different directions which may then be stitched together to form a cohesive image. For example, in an embodiment of a spherical camera system, the camera 115 may include two camera cores 910 each having a hemispherical or hyper hemispherical lens that each captures a hemispherical or hyper hemispherical field of view which are stitched together in post-processing to form a spherical image.

The lens 912 may be, for example, a wide angle lens, hemispherical, and/or hyper hemispherical lens that focuses light entering the lens to the image sensor 914 which captures images and/or video frames. The image sensor 914 may capture high-definition images having a resolution of, for example, 720p, 1080p, 4k, or higher. In one embodiment, spherical video is captured as 5760 pixel by 2880 pixel frames with a 360° horizontal field of view and a 180° vertical field of view. For video, the image sensor 914 may capture video at frame rates of, for example, 30 frames per second, 60 frames per second, or higher. The image processor 916 may perform one or more image processing functions of the captured images or video. For example, the image processor 916 may perform a Bayer transformation, demosaicing, noise reduction, image sharpening, image stabilization, rolling shutter artifact reduction, color space conversion, compression, and/or other in-camera processing functions. Processed images and/or video may be temporarily or persistently stored to the system memory 930 and/or to another non-volatile storage, which may be in the form of internal storage or an external memory card.

An input/output (I/O) interface 960 may transmit and/or receive data from various external devices. For example, the I/O interface 960 may facilitate the receiving or transmitting video or audio information through one or more I/O ports. Examples of I/O ports or interfaces include USB ports, HDMI ports, Ethernet ports, and audio ports. Furthermore, embodiments of the I/O interface 960 may include one or more wireless ports that may accommodate wireless connections. Examples of wireless ports include Bluetooth, Wireless USB, and/or Near Field Communication (NFC). The I/O interface 960 also may include an interface to synchronize the camera 115 with other cameras or with other external devices, such as a remote control, a second camera, a smartphone, a client device, and/or a video server.

A control/display subsystem 970 may include various control and display components associated with operation of the camera 115 including, for example, LED lights, a display, buttons, microphones, and/or loudspeakers. The audio subsystem 950 may include, for example, one or more microphones and/or one or more audio processors to capture and process audio data correlated with video capture. In one embodiment, the audio subsystem 950 may include a microphone array having two or microphones arranged to obtain directional audio signals.

The sensors 940 may capture various metadata concurrently with, or separately from, video capture. For example, the sensors 940 may capture time-stamped location information based on a global positioning system (GPS) sensor, and/or an altimeter. Other sensors 940 may be used to detect and capture the orientation of the camera 115 including, for example, an orientation sensor, an accelerometer, a gyroscope, or a compass (e.g., a magnetometer compass). Sensor data captured from the various sensors 940 may be processed to generate other types of metadata. For example, sensor data from the accelerometer may be used to generate motion metadata that may include velocity and/or acceleration vectors representative of motion of the camera 115.

Furthermore, sensor data from the aerial vehicle 110 and/or the gimbal 175 may be used to generate orientation metadata describing the orientation of the camera 115. Sensor data from a GPS sensor may provide GPS coordinates identifying the location of the camera 115, and an altimeter may measure the altitude of the camera 115. In one embodiment, the sensors 940 may be rigidly coupled to the camera 115 such that any motion, orientation or change in location experienced by the camera 115 is also experienced by the sensors 940. The sensors 940 furthermore may associate a timestamp representing when the data was captured by each sensor. In one embodiment, the sensors 940 automatically begin collecting sensor metadata when the camera 115 begins recording a video.

Example Remote Control System

Figure 10:
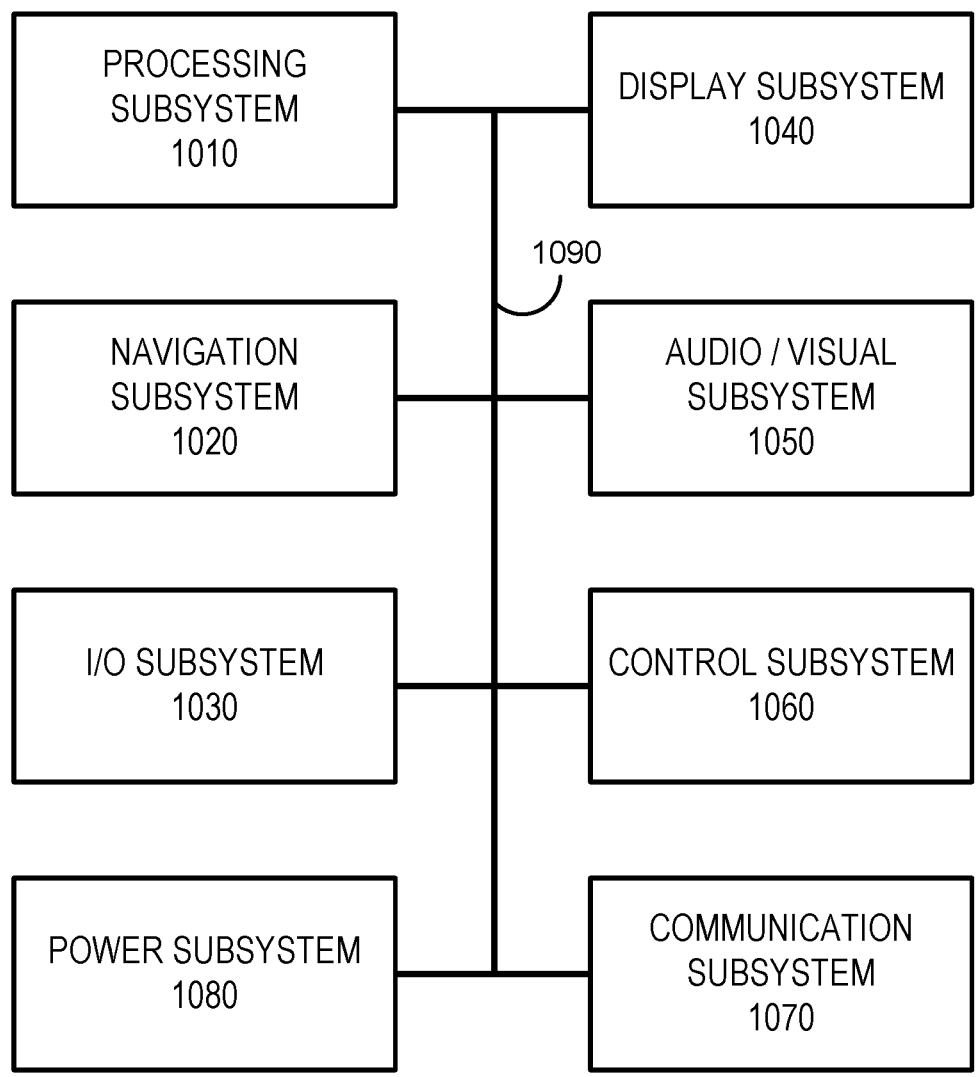
FIG. 10 illustrates a block diagram of an example remote control system of a remote controller.

FIG. 10 illustrates a block diagram of an example remote control system 1005 of a remote controller, e.g., remote controller 120. The remote control system 1005 may include a processing subsystem 1010, a navigation subsystem 1020, an input/output (I/O) subsystem 1030, a display subsystem 1040, an audio/visual (A/V) subsystem 1050, a control subsystem 1060, a communication subsystem 1070, and/or a power subsystem 1080. The subsystems may be communicatively coupled through a data bus 1090 and may be powered, where necessary, through the power subsystem 1080.

The processing subsystem 1010 may be configured to provide the electronic processing infrastructure to execute firmware and/or software comprised of instructions. An example processing subsystem 1010 is illustrated and further described in FIG. 17. The navigation subsystem 1020 may include electronics, controls, and/or interfaces for navigation instrumentation for the remote controller 120. The navigation subsystem 1020 may include, for example, a global position system (GPS) and a compass (e.g., a compass including a magnetometer). The GPS and compass may be used to track the location of the remote controller 120, which can be used to determine the position of the remote controller 120 relative to that of the aerial vehicle 110, and vice versa.

The I/O subsystem 1030 may include the input and output interfaces and electronic couplings to interface with devices that allow for transfer of information into or out of the remote controller 120. For example, the I/O subsystem 1030 may include a physical interface such as a universal serial bus (USB) or a media card (e.g., secure digital (SD)) slot. The I/O subsystem 1030 also may be associated with the communication subsystems 1070 to include a wireless interface such as Bluetooth. It is noted that in one example embodiment, the aerial vehicle 110 may use long-range Wi-Fi radio (or some other type of WLAN) via the communication subsystem 1070, but also may use a second Wi-Fi radio or cellular data radio (as a part of the I/O subsystem 1030) for connection to other wireless data enabled devices, for example, smart phones, tablets, laptop or desktop computers, and/or wireless internet access points. Moreover, the I/O subsystem 1030 also may include other wireless interfaces, e.g., Bluetooth, for communicatively coupling to devices that are similarly wirelessly enabled for short-range communications.

The display subsystem 1040 may be configured to provide an interface, electronics, and/or display drivers for the screen 170 of the remote controller 120. The Audio/Visual (A/V) subsystem 1050 may include interfaces, electronics, and/or drivers for an audio output (e.g., headphone jack or loudspeakers) as well as visual indicators (e.g., LED lighting associated with, for example, the buttons 160 and/or button 165).

The control subsystem 1060 may include electronic and control logic and/or firmware for operation with the control panels 150, 155, buttons 160, 165, and other control mechanisms on the remote controller 120.

The communication subsystem 1070 may include electronics, firmware and/or interfaces for communications. The communication subsystem 1070 may include one or more of wireless communication mechanisms such as Wi-Fi (short and long-range), long term evolution (LTE), 3G, 4G, and/or 5G. The communication subsystem 1070 also may include wired communication mechanisms such as Ethernet, USB, and/or HDMI.

The power subsystem 1080 may include electronics, firmware, and/or interfaces for providing power to the remote controller 120. The power subsystem 1080 may include direct current (DC) power sources (e.g., batteries), but also may be configured for alternating current (AC) power sources. The power subsystem 1080 also may include power management processes for extending DC power source lifespan. It is noted that in some embodiments, the power subsystem 1080 may include a power management integrated circuit and a low power microprocessor for power regulation. The microprocessor in such embodiments may be configured to provide very low power states to preserve battery, and may be able to wake from low power states from such events as a button press or an on-board sensor (like a hall sensor) trigger.

Example Flight Plan Control System for Remote Controller

Turning now to preparing an aerial vehicle, e.g., aerial vehicle 110, for flight, the disclosed configuration may include mechanisms for programming the aerial vehicle 110 for flight through a remote controller, e.g., remote controller 120. For example, a flight plan may be uploaded to the aerial vehicle 110. In some embodiments, while the flight plan is being uploaded, the compass 322 may be calibrated (e.g., via the calibration process 510). The flight plan may provide the aerial vehicle 110 with basic flight related parameters, while the remote controller 120 is used to provide overall control of the aerial vehicle 110.

Figure 11:
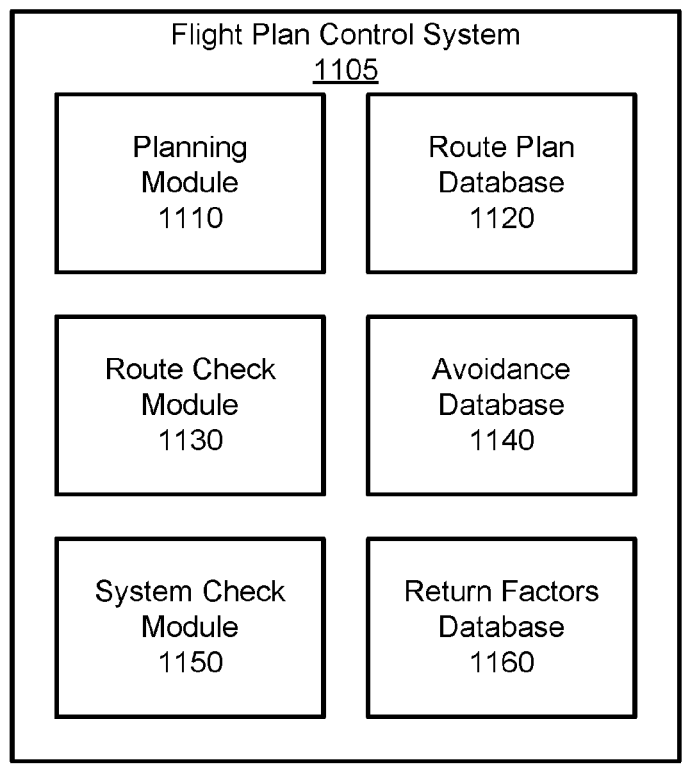
FIG. 11 illustrates a functional block diagram of an example flight plan control system for a remote controller.

FIG. 11 illustrates a functional block diagram of an example flight plan control system 1105 for a remote controller (e.g., remote controller 120). The system 1105 may include a planning module 1110, a route plan database 1120, a route check module 1130, an avoidance database 1140, a system check module 1150, and/or a return factors database 1160. It is noted that the modules may be embodied as software (including firmware). The software may be program code (or software instructions) executable by the processing subsystem 1010.

The flight plan control system 1105 may be configured to provide flight (or route) planning tools that allow for preparing a flight plan of the aerial vehicle 110. The planning module 1110 may include user interfaces displayed on the screen 170 of the remote controller 120 that allows for entering and viewing of information such as route (how and where the aerial vehicle 110 will travel), maps (geographic information over where the aerial vehicle 110 will travel), environmental condition data (e.g., wind speed and direction), terrain condition data (e.g., locations of tall dense shrubs), and/or other information necessary for planning a flight of the aerial vehicle 110.

Figure 17:
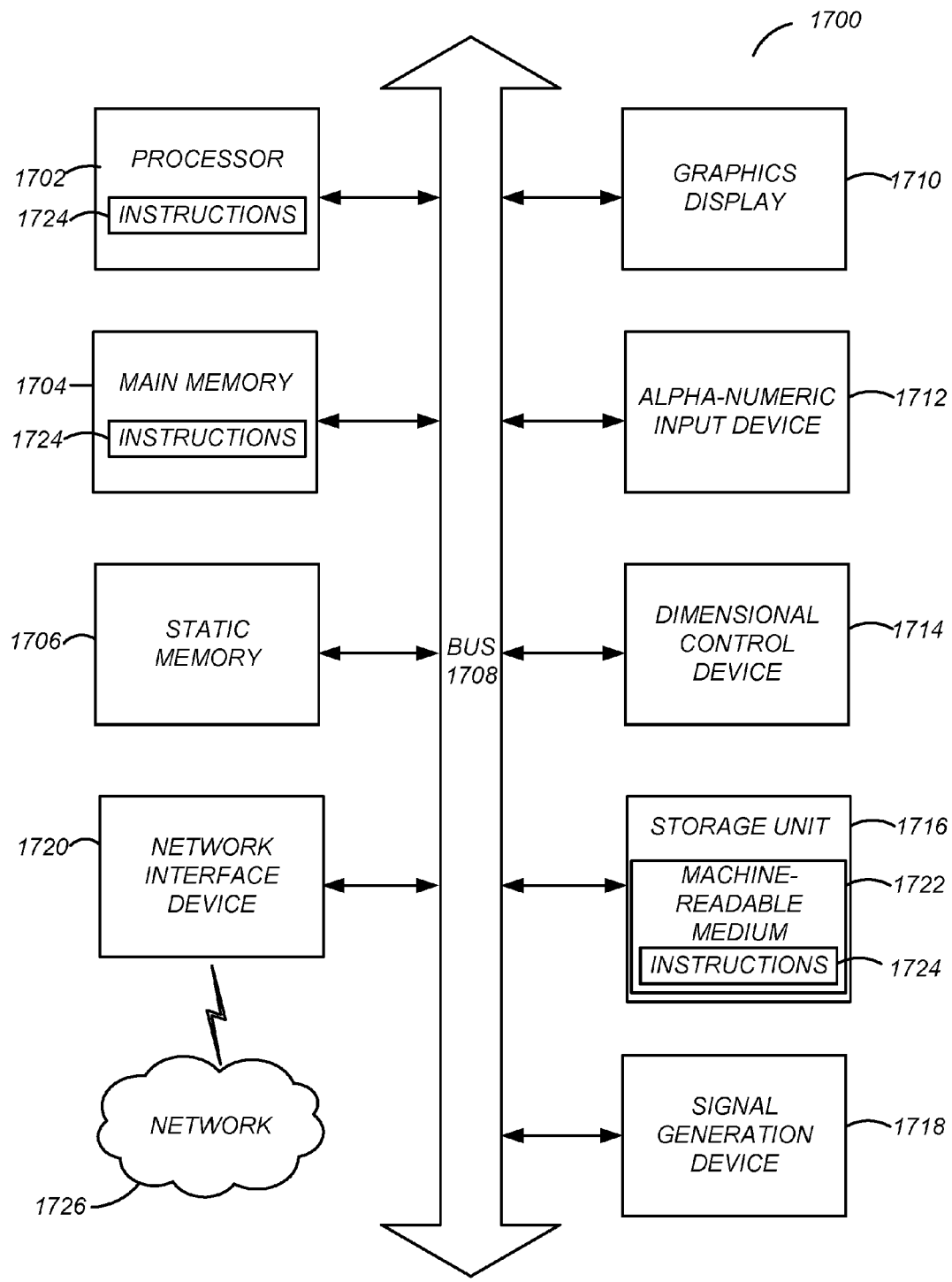
FIG. 17 illustrates an example machine for use with a system of the remote controlled aerial vehicle.

The route plan database 1120 may provide a repository (e.g., part of a storage device such as an example storage unit described with FIG. 17) for prepared flight plans to be stored. The route plan database 1120 may also store plans that were previously created on the remote controller 120 and/or uploaded into it (e.g., through the I/O subsystem 1030). The stored plans may be retrieved from the route plan database 1120 and edited as appropriate through the planning module 1110.

The route plan database 1120 also may store preplanned (pre-programmed) maneuvers for the aerial vehicle 110 that may be retrieved and applied with a flight plan created through the planning module 1110. For example, a "loop de loop" maneuver may be pre-stored and retrieved from the route plan database 1120 and then applied to a flight plan over a mapped area via the planning module 1110. The map of the mapped area may also be stored in and retrieved from the route plan database 1120. It is noted that the route plan may be configured to provide a predefined "band" (area or region where operation is permissible) within with the aerial vehicle 110 is controlled through the remote controller 120.

The route check module 1130 may be configured to conduct a check of the desired route to evaluate potential issues with the route planned. For example, the route check module 1130 may be configured to identify particular factors such as terrain elevation that may be challenging for the aerial vehicle 110 to clear. The route check module 1130 may check environment conditions through the planned route to provide information on potential challenges such as wind speed or direction.

The route check module 1130 may also retrieve data from the avoidance database 1140 for use in checking a particular planned route. The data stored in the avoidance database 1140 may include data such as flight related restriction in terms of areas and/or boundaries for flight (e.g., no fly areas or no fly beyond a particular boundary (aerial restrictions)), altitude restrictions (e.g., no fly above a ceiling of some predefined altitude or height), proximity restrictions (e.g., power lines, vehicular traffic conditions, or crowds), and/or obstacle locations (e.g., monuments and/or trees). The data retrieved from the avoidance database 1140 may be used to compare against data collected from the sensors on the aerial vehicle 110 to see whether the collected data corresponds with, for example, a predefined condition and/or whether the collected data is within a predetermined range of parameters that is within an acceptable range of error.

The route check module 1130 also may include information corresponding to where the aerial vehicle 110 can or cannot set down. For example, the route check module 1130 may incorporate information regarding where the aerial vehicle 110 cannot land ("no land zone"), such as, highways, bodies of water (e.g., a pond, stream, rivers, lakes, or ocean), and/or restricted areas. Some retrieved restrictions may be used to adjust the planned route before flight so that when the plan is uploaded into the aerial vehicle 110 a user is prevented from flying along a particular path or in a certain area (e.g., commands input by the user into the remote controller 120 are overridden by the remote controller 120 or the aerial vehicle 110). Other retrieved restriction data from the avoidance database 1140 may be stored with the route plan and also may be uploaded into the aerial vehicle 110 for use during the flight by the aerial vehicle 110. The stored restriction data may be used to make route adjustments when detected, e.g., via the system check module 1150 described below.

Referring back to the route check module 1130, it also may be configured to alter or provide recommendations to alter the route plan to remove conditions in the flight plan path that may not be conducive for the aerial vehicle 110 to fly through. The altered path or suggested path may be displayed through the planning module 1110 on the screen 170 of the remote controller 120. The revised route may be further modified if so desired and checked again by the route check module 1130 in an iterative process until the route is shown as clear for flight of the aerial vehicle 110.

The system check module 1150 may be configured to communicate with the aerial vehicle 110, e.g., through the communication subsystem 1070. The system check module 1150 may receive data from the aerial vehicle 110 corresponding to conditions of the aerial vehicle 110 or the surroundings within which the aerial vehicle 110 is operating. The system check module 1150 may interface with the planning module 1110 and route check module 1130 to make route adjustments for the aerial vehicle 110 as it operates and moves along the planned route.

The planning module 1110, and in some embodiments the route check module 1130, also may interface with the return factors database 1160. The return factors database 1160 may store return related data corresponding to when the aerial vehicle 110 should return to a predefined spot. This data may be stored with the route plan and uploaded into the aerial vehicle 110. The data also may be used by the system check module 1150 to trigger an action for the aerial vehicle 110 to fly to the return location. The return data may be data related to the aerial vehicle 110, such as battery power (e.g., return if battery power is below a predefined threshold that would prevent return of the aerial vehicle 110) or a mechanical condition (e.g., rotor engine stall, burnout, and/or another malfunction). The return data also may be environment data (e.g., wind speed in excess of a predefined threshold) and/or terrain data (e.g., tree density beyond predefined threshold). The return location may be predefined through the planning module 1110 by providing, for example, GPS coordinates. Alternately, it may be the location of the remote controller 120. The aerial vehicle 110 may be configured to set down at or near its current location if the system check module 1150 determines that the aerial vehicle 110 will not be able to return to the predefined location in view of the return data information received.

It is noted that the databases 1120, 1140, 1160 of the system 1105 may be updated and/or augmented. For example, where there may be a local WLAN (e.g., Wi-Fi) or cellular data connection, e.g., through the I/O subsystem 1030, the data gathered from sources such as the internet may be used to update the route plan database 1120, the avoidance database 1140, and the return factors database 1160. Moreover, with such data communication, the databases may be updated in real-time so that information may be updated and utilized during flight. Further, the updated data may be transmitted to the communication subsystem 310 of the aerial vehicle 110 in real-time to update the route plan or return path information (further described below) as it becomes available.

Figure 13:
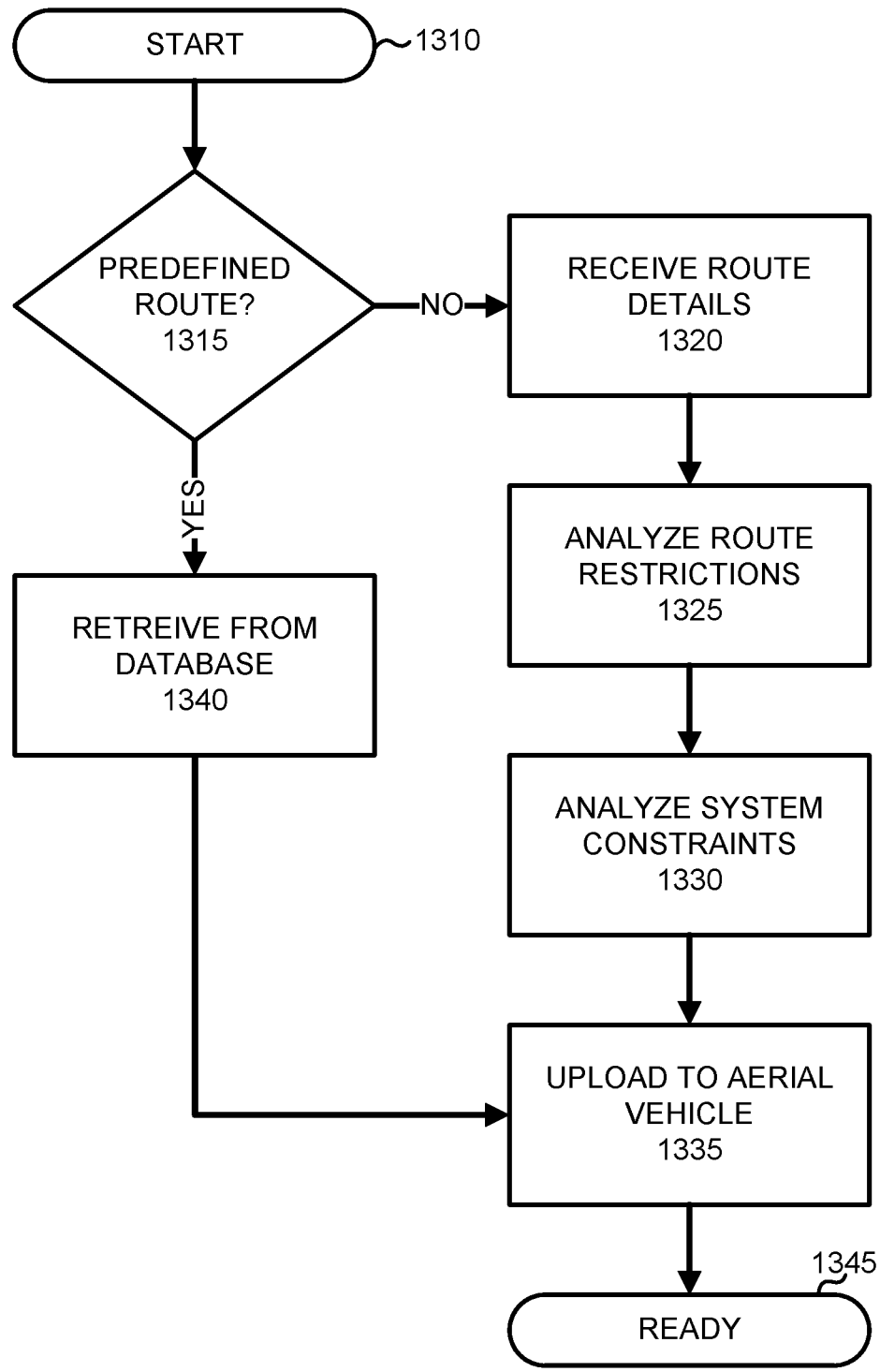
FIG. 13 illustrates a flow diagram for an example program path operation on a remote controller.

Additional examples of route plan related configurations on a remote controller 120 are described with FIGS. 9 and 10. FIG. 13 illustrates a flow diagram for an example route plan programmed on a remote controller 120. The process may start 1310 with the remote control system 1005 determining 1315 whether there is pre-defined flight route (or path). If not, the process may receive flight route details 1320 using, for example, the planning module 1110 and route planning database 1120. The process analyzes 1325 route restrictions using, for example, the route check module 1130 and avoidance database 1140. The process also may analyzes 1330 system constraints through, for example, the avoidance database and system check module 1150 (e.g., battery life left on the aerial vehicle 110). The process may upload 1335 the route details to the aerial vehicle 110. The route also may be stored in the route plan database 1120 before being ready for the next actions 1345.

If the process determines 1315 that a predefined route will be used, that route plan may be retrieved from the route plan database 1120. The retrieved route plan may be uploaded 1335 to the aerial vehicle 110. If adjustments are made to the retrieved route plan, the process may undertake the steps of analyzing 1325 the route restrictions and analyzing 1330 the system constraints before being uploaded 1335 to the aerial vehicle 110. The processes of analyzing 1325, 1330 may be iterative before upload 1335 and before being ready 1345 for the next actions.

Figure 14:
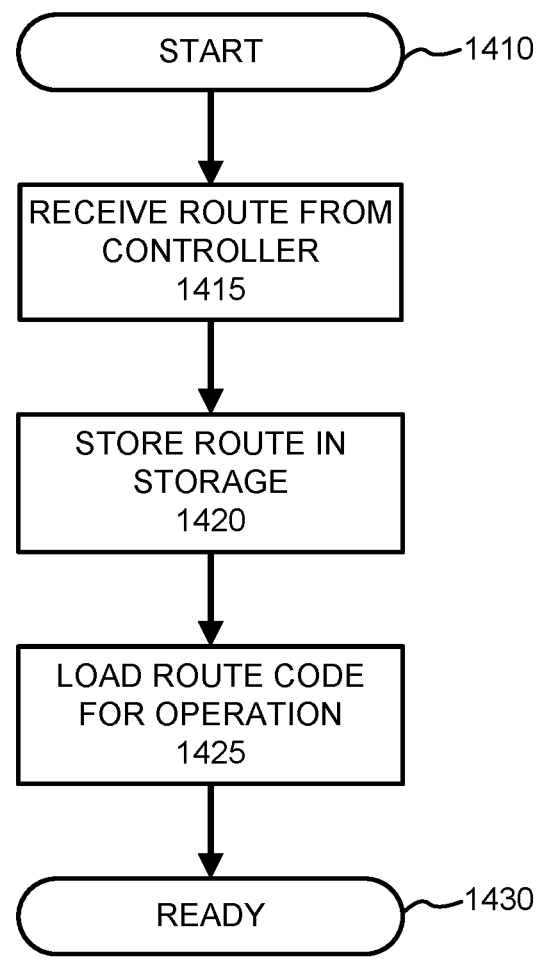
FIG. 14 illustrates a flow diagram for an example program path operation load on a remote controlled aerial vehicle.

Turning to FIG. 14, it illustrates a flow diagram for an example program load operation onto the aerial vehicle 110. The process may start 1410 with the flight controller 315 processing subsystem receiving 1415 the route information from the remote controller 120. The received route information may be stored 1420 in a storage (e.g., memory and/or flash storage). When ready for execution, the process may retrieve the stored route information and load 1425 the route information and/or corresponding executable code for execution by the flight controller 315 processing subsystem. Subsequent to this, the aerial vehicle 110 may be ready 1430 for flight using the loaded route information.

Example Flight Control System for Aerial Vehicle

Figure 12:
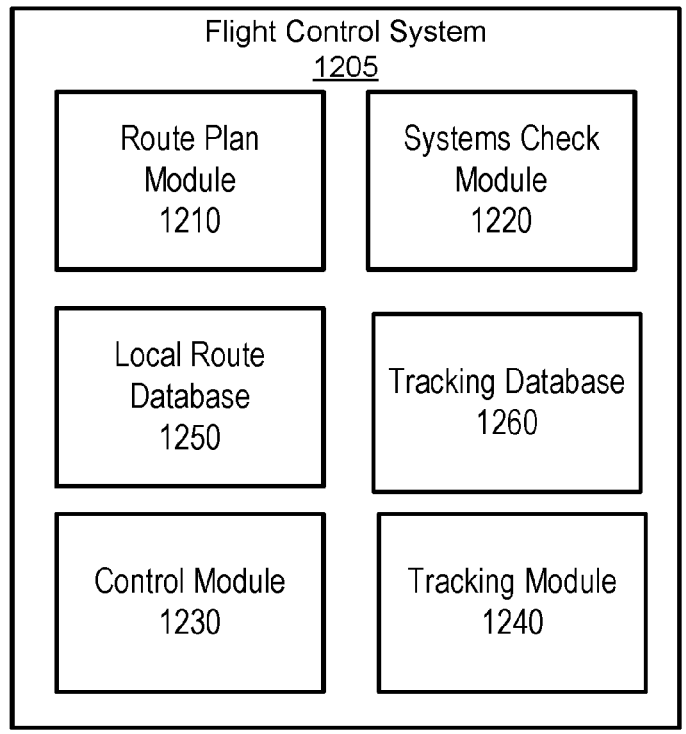
FIG. 12 illustrates a functional block diagram of an example flight plan control system for a remote controlled aerial vehicle.

Turning now to FIG. 12, it illustrates a functional block diagram of an example flight control system 1205 for a remote controlled aerial vehicle, e.g., aerial vehicle 110. The flight control system 1205 may include a route plan module 1210, a systems check module 1220, a control module 1230, tracking module 1240, a local route database 1250, and/or a tracking database 1260.

It is noted that the modules of the flight control system 1205 may be embodied as software (including firmware). The software may be program code (or software instructions) stored in a storage medium and executable by the flight controller 315 processing subsystem.

The route plan module 1210 may be configured to execute the route plan for the aerial vehicle 110. The route plan may be one uploaded from the remote controller 120 as described in conjunction with FIG. 14. The route plan may be transmitted via the communication subsystem 1070 of the remote controller 120 and received by the communication subsystem 310 of the aerial vehicle 110. The route plan may be configured to provide a predefined "band" within which the aerial vehicle 110 is controlled. The systems check module 1220 may be configured to monitor operational systems of the aerial vehicle 110 and flight environment and terrain sensor data captured by the aerial vehicle 110 when in operation. The operational systems information may include information related to flight of the aerial vehicle 110, for example, remaining battery power, mechanical operation, and/or electrical operation. Flight environment and terrain sensor data may correspond to data from the sensor subsystem 320 of the aerial vehicle 110, for example, temperature, moisture, wind direction, object detection, altitude, and/or direction (e.g., heading) data.

The control module 1230 may be configured to control operation of the aerial vehicle 110 when it is in flight. The control module 1230 may be configured to receive control commands from the remote controller 120. The received commands may be, for example, generated via the control panels 150, 155 and transmitted from the communication subsystem 1070 of the remote controller 120 for receiving and processing at the aerial vehicle 110 via its communication subsystem 310 and flight controller 315. The received commands may be used by the control module 1230 to manipulate the appropriate electrical and mechanical subsystems of the aerial vehicle 110 to carry out the control desired.

The control module 1230 also may interface with the route plan module 1210 and the systems check module 1220 to ensure that the controls executed are within the permissible parameter of the route (or path) provided by the route plan module 1210. Further, when an aerial vehicle 110 is in flight, there may be instances in which early detection of potential problems may be beneficial so that course (including flight) modifications can be taken when necessary and feasible. The control module 1230 also may make course changes in view of receiving information from the systems check module 1220 that may indicate that such course correction is necessary, for example, to navigate around an object detected by the sensor subsystem 320 and/or detected and analyzed by the camera 115. Other example course changes may occur due to wind levels exceeding a threshold at a particular altitude so that the aerial vehicle 110 may move to a lower altitude where wind may be less of an issue despite the control information received from the remote controller 120. In making these changes, the control module 1230 may work with the tracking module 1240 to update the local route database 1250 to identify locations of objects or identify areas of flight that would be identified for avoidance for other reasons (e.g., weather conditions and/or electronic interference) for tracking by the tracking module 1240 and for later upload to an avoidance database, e.g., avoidance database 1140.

The tracking module 1240 may be configured to track the flight of the aerial vehicle 110 (e.g., data corresponding to "clear" path of flying). The tracking module 1240 also may store this information in the tracking database 1260 and/or may store information in the local route database 1250. The tracking module 1240 may be used to retrieve the route the aerial vehicle 110 actually took and use that data to track back to a particular location (e.g., the return location). This may be of particularly interest in situations in which the aerial vehicle 110 needs to be set down (e.g., land) as quickly as possible and/or execute a return path. For example, if the systems check module 1220 detects an impending power, electrical, and/or mechanical issue that may affect further flying of the aerial vehicle 110, it may instruct the control module 1230 to configure itself into an override mode. In the override mode, the control module 1230 may limit or cut off the control information received from the remote controller 120. The control module 1230 may retrieve a return path from the tracking module 1240 for the aerial vehicle 110 to identify a location where the aerial vehicle 110 can be set down as quickly as possible based on data from the systems check module 1220, e.g., amount of battery power remaining and/or execute a return path. For example, upon executing a return path, the control module 1230 may determine that the battery power left does not allow for return to a predefined location and determine that the aerial vehicle 110 may instead need to land somewhere along the clear path.

Figure 15:
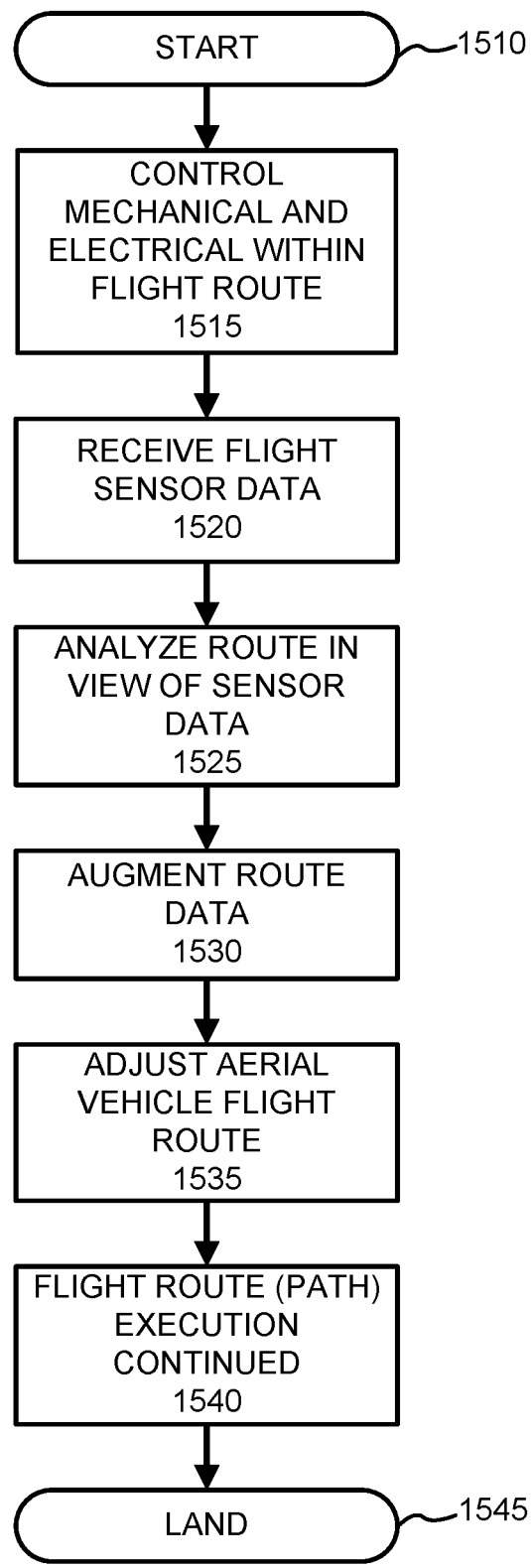
FIG. 15 illustrates a flow diagram for an example program path operation on a remote controlled aerial vehicle.

FIG. 15 provides an example of additional details for flight control operation on the aerial vehicle 110. In particular, FIG. 15 illustrates a flow diagram for an example program path operation on the aerial vehicle 110. The process may start 1510 with control information being received from the remote controller 120 through the communication subsystem 310 of the aerial vehicle 110. The control information may be processed by the flight controller 315 to control 1515 the mechanical and electrical components of the aerial vehicle 110 within the context of the programmed flight route. The sensor subsystem 320 may receive 1520 flight data information from sensors on board the aerial vehicle 110. This sensor data may include an orientation of the aerial vehicle 110 detected by the compass 322. This data may be analyzed 1525 by the systems check module 1220. The control module 1230 may augment 1530 the analyzed data based on other information to modify the route, e.g., detection of an object by the sensor subsystem 320 and/or image analysis of an image captured by the camera 115. In such instances, the aerial vehicle 110 flight route may be adjusted 1535 by the control module 1230. When the flight route is completed 1540, the aerial vehicle 110 may continue to fly within the parameters of system operation and flight route (or path) until the aerial vehicle 110 has landed 1545. It is noted that the aerial vehicle 110 may be configured not to land within locations predefined as "no land zones." In such situations, a user of the remote controller 120 may continue to fly the aerial vehicle 110 to an area where landing 1545 is permitted.

Example Return Path Operation on Aerial Vehicle

As noted previously, there may be instances in which the aerial vehicle 110 may need to execute a return path. For example, operational conditions on the aerial vehicle 110 or a signal of return to home from the remote controller 120 may trigger a return path. On the aerial vehicle 110, the route plan module 1210, control module 1230 and/or tracking module 1240 may be configured to provide a return path. The return path may have been preprogrammed from the flight plan, but thereafter modified with information picked up during flight of the aerial vehicle 110 and stored during flight. For example, during flight, the sensors on the aerial vehicle 110 may detect obstacles that should be avoided that obstruct the pre-programmed return path. A detected obstacle and/or corresponding location data (e.g., GPS coordinates or points) of that obstacle may be stored in the local route database 1250. The route plan module 1210, control module 1230, and/or tracking module 1240 may execute a return path operation on the aerial vehicle 110. The return path operation may include retrieving the return path program, extracting data corresponding to obstacles (or other avoidance data) determined to be in the return path that were detected and stored during flight, revising the return path program to adjust for those obstacles (e.g., changes route to clear object), and/or executing the modified return path so that the obstacles are avoided on the return path.

The disclosed configuration may beneficially implement an intelligent return to home behavior for the aerial vehicle 110. The return to home configuration may use a return path that is a direct path from a current location to a predefined location. Alternately, or in addition, the direct route may incorporate obstacle avoidance. By way of example, assume during flight the aerial vehicle 110 flies around a tree. This data (e.g., location data) may be stored in the aerial vehicle 110. Later, if a "return to home" (or "come home") button is selected on the remote controller 120, the aerial vehicle 110 return path may track back along the direct route while avoiding the tree, which is identified as an obstacle. Hence, the disclosed configuration return path may track back along what may be a clear path on the way back because such path avoided obstacles. In addition, the clear path may be direct path from a current location to a predetermined location (e.g., an initial take off location and/or initial location where data was captured) and may avoid redundant points along the route (e.g., multiple passes around a tree or building). The clear path may be saved within the aerial vehicle 110. In addition, if the compass 322 is automatically-calibrated prior to flight as previously described, the return path executed may be capable of automatic guidance along a path that should correspond to the expected directional path. In some example embodiments, in addition to obstacle avoidance, the return path program may use a direct route back to the predefined location to land or a place to land along that route that is determined to be clear. Landing at a place other than the predefined location may be due to other factors coming into consideration, for example, if battery power is insufficient to return to predefined location or mechanical integrity would prevent return to predefined location.

The disclosed configuration may reduce or remove aspects of flight behavior of the aerial vehicle 110 that would be unnecessary for a return path. For example if the aerial vehicle 110 flew several loops around a tree, it may be undesirable to backtrack all of the loops when on a return path. Accordingly, the aerial vehicle 110 may be configured to mark areas as "clear" (i.e., areas that are clear may then be identified through "clear breadcrumbs") as the aerial vehicle 110 is in flight. The clear path may be generated, for example, by removing location data (e.g., GPS) of the tracked flight path that may be redundant and/or accounting for obstacle data that may have been collected so as to avoid those obstacles. Further, it may be a direct flight path from a current location of the aerial vehicle to a predetermined location (e.g., initial take off location). The data corresponding to "clear" may be assembled into a graph for use in a return path. Thereafter, if the aerial vehicle 110 needs to come back (e.g., execute a return path) to the starting location, the aerial vehicle 110 may take the shortest path through the graph of the cleared areas. This information may be stored and used through the control module 1230 and/or the tracking module 1240. Hence, if the aerial vehicle 110 flew a path with several loops and figure eights and this path self-intersects, the control module 1230 may make connections at those intersections, build a graph corresponding to the intersections in that flight, and take a shortest path through cleared area back to a return location, for example, by removing redundant location data collected along the flight path. The process also may use an initial take off location of the aerial vehicle 110 (e.g., where the aerial vehicle 110 started flying from) as the return location.

Figure 16:
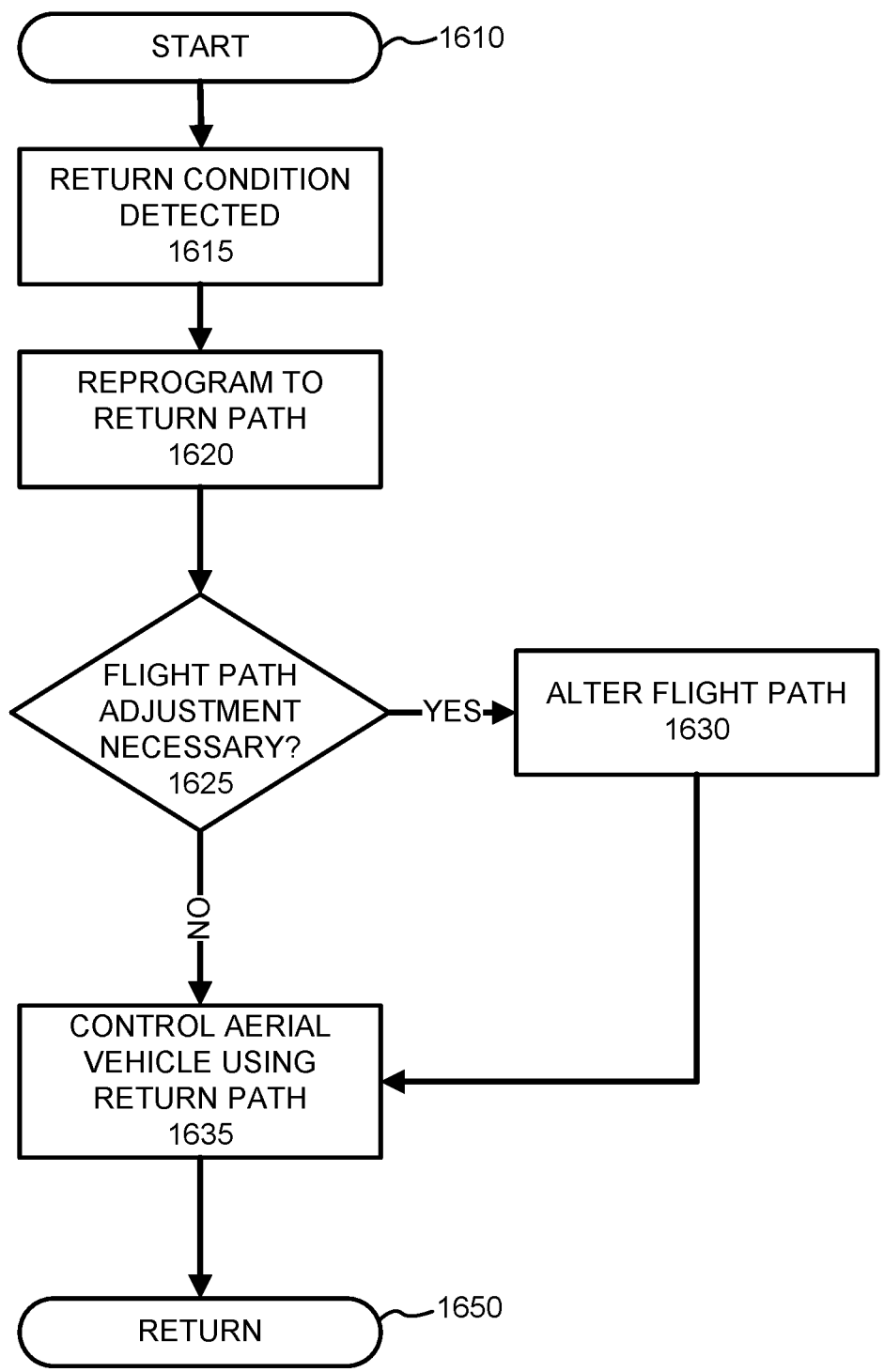
FIG. 16 illustrates a flow diagram for an example return path operation on a remote controlled aerial vehicle.

FIG. 16 illustrates a flow diagram for an example return path operation on an aerial vehicle 110. The return path may be executed due to voluntary action, e.g., user selection of the return button 165 on the remote controller 120, or through involuntary action. Involuntary actions may include system related issue on the aerial vehicle 110, for example, low battery power, mechanical issues, and/or electrical issues. The involuntary actions may also be triggered by sources such as location information or environmental information such as flying in a defined boundary or area, weather and climatic issues (e.g., wind and/or precipitation), and/or physical considerations such as object density (e.g., the density of trees in a geographic area). The aerial vehicle 110 monitoring may be set up through the return factors database 1160 and monitored for triggering of a return condition through the systems check module 1220, which may work in conjunction with the control module 1230 to trigger a return mode.

In this example, the return path operation may start 1610 by detection 1615 of a return condition, for example, the systems check module 1220 detecting an impending power, electrical, and/or mechanical issue. The control module 1230, in conjunction with the route plan module 1210 may trigger a reprogramming 1620 of the aerial vehicle 110 to now follow a return path. The control module 1230 may work in conjunction with the route plan module 1210, which may have preprogrammed coordinates of a return location. Also, the control module 1230 may work in conjunction with the tracking module 1240, which may include information on possible return paths accounting for potential obstacles as may have been logged in the tracking database 1260 during flight of the aerial vehicle 110. It is noted that, in some embodiments, the aerial vehicle 110 also may track "clear" areas during flight and store those locations. Thereafter, if a return path is triggered, either manually or automatically, the "cleared" location data points may be retrieved to generate a return flight path that the control module 1230 can execute. This configuration may be beneficial, for example, if no return path is programmed or circumstances do not allow for return to a precise return location (e.g., a "home" location).

As the return flight path is executed and the aerial vehicle 110 enters the return mode, the control module 1230 may override control information arriving from the remote controller 120 and engage in an auto-pilot to navigate to the location pre-defined with the return to home. If there are flight adjustments 1625, the process may alter 1630 the return flight path according to information stored and processed by the tracking module 1240, the tracking database 1260, and/or the local route database 1250. The control module 1230 may be configured to control 1635 the aerial vehicle 110 back to the return location 1650. The return location 1650 may be identified in the route plan module 1210 (e.g., the original route plan may include coordinates for a return location), may use the location of the remote controller 120 (e.g., using its GPS location) as a return location, and/or may identify an intermediate location as determined through the local route database 1250 and/or the tracking database 1260 in conjunction with the tracking module 1240 and the route plan module 1210.

It is noted that other operational scenarios also may trigger a return flight path. For example, the systems check module 1220 may closely monitor maintenance of a communication link (e.g., the wireless link 125) between the communications subsystem 310 of the aerial vehicle 110 and the communication subsystem 1070 of the remote controller 120. A loss of a communication link between the communications subsystem 310 of the aerial vehicle 110 and the communication subsystem 1070 of the remote controller 120 may trigger a return path. In this example, the system may be configured so that if the communication link has been severed, the systems check module 1220 notifies the control module 1230 to try to reestablish the communication link. If the communication link is not established within a predefined number of tries or a predefined time period, the control module 1230 may trigger the start of the return flight path as described above.

Example Machine Architecture

As has been noted, the aerial vehicle 110 may be remotely controlled by the remote controller 120. The aerial vehicle 110 and the remote controller 120 may be machines that may be configured to operate using software. FIG. 17 is a block diagram illustrating components of an example machine able to read instructions from a machine-readable medium and execute them in one or more processors (or controllers). All or portions of the example machine described in FIG. 17 may be used with the aerial vehicle 110 and/or the remote controller 120 and/or other parts of a system that interfaces with the aerial vehicle 110 and/or the remote controller 120.

In FIG. 17, there is a diagrammatic representation of a machine in the example form of a computer system 1700. The computer system 1700 may be used to execute instructions 1724 (e.g., program code or software) for causing the machine to perform any one or more of the methodologies (or processes) described herein. In some embodiments, the machine may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example may be a handheld controller (e.g., remote controller 120) to control the aerial vehicle 110. The architecture described also may be applicable to other computer systems that operate in the system of the aerial vehicle 110 with camera and mounting configuration, e.g., in setting up a local positioning system. These other example computer systems may include a server computer, a client computer, a personal computer (PC), a tablet PC, a smartphone, an internet of things (IoT) appliance, a network router, switch or bridge, and/or any machine capable of executing instructions 1724 (sequential or otherwise) that specify actions to be taken by that machine. Further, while only a single machine is illustrated, the term "machine" may also refer to include any collection of machines that individually or jointly execute instructions 1724 to perform any one or more of the methodologies discussed herein.

The example computer system 1700 includes one or more processing units (generally processor 1702). The processor 1702 may be, for example, a central processing unit (CPU), a graphics processing unit (GPU), a digital signal processor (DSP), a controller, a state machine, one or more application specific integrated circuits (ASICs), one or more radio-frequency integrated circuits (RFICs), and/or any combination of these. The computer system 1700 also may include a main memory 1704. The computer system 1700 may include a storage unit 1716. The processor 1702, memory 1704 and/or the storage unit 1716 may communicate via a bus 1708.

In addition, the computer system 1700 may include a static memory 1706, a display driver 1710 (e.g., to drive a screen (e.g., screen 170) such as a plasma display panel (PDP), a liquid crystal display (LCD), and/or a projector). The computer system 1700 may also include input/output devices, e.g., an alphanumeric input device 1712 (e.g., a keyboard), a dimensional (e.g., 2-D or 3-D) control device 1714 (e.g., a mouse, a trackball, a joystick, a motion sensor, and/or other pointing instrument), a signal generation device 1718 (e.g., a loudspeaker), and/or a network interface device 1720, which also may be configured to communicate via the bus 1708.

The storage unit 1716 may include a machine-readable medium 1722 on which is stored instructions 1724 (e.g., software) embodying any one or more of the methodologies or functions described herein. The instructions 1724 also may reside, completely or at least partially, within the main memory 1704 or within the processor 1702 (e.g., within a processor's cache memory) during execution thereof by the computer system 1700. The main memory 1704 and the processor 1702 also may constitute machine-readable media. The instructions 1724 may be transmitted or received over a network 1726 via the network interface device 1720.

While the machine-readable medium 1722 is shown in the example embodiment depicted in FIG. 17 to be a single medium, the term "machine-readable medium" may refer to a single medium or multiple media (e.g., a centralized database, a distributed database, and/or associated caches and servers) able to store the instructions 1724. The term "machine-readable medium" may also refer to any medium that is capable of storing instructions 1724 for execution by the machine and that cause the machine to perform any one or more of the methodologies disclosed herein. The term "machine-readable medium" may include, but is not limited to, data repositories in the form of solid-state memories, optical media, and magnetic media.

Additional Considerations

The disclosed configuration may beneficially calibrate a magnetometer of a compass. With a global navigation satellite system receiver, a current position may be determined. The determined position is used to determine a magnetic inclination (e.g., by a global magnetic field model such as the World Magnetic Model). The calibration system may perform different calibration sequences based on the magnetic inclination. In a first calibration sequence, performed responsive to a determination that a magnetic inclination (or the absolute value of the magnetic inclination) is less than a threshold, magnetic field data is detected by the magnetometer as it is rotated through horizontal rotation paths. If the magnetic inclination is greater than the threshold, magnetic field data is detected by the magnetometer as it is rotated through vertical rotation paths. The detected magnetic field data may be used to determine calibration values for the magnetometer compass.

Throughout this specification, plural instances may implement components, operations, or structures described as a single instance. Although individual operations of one or more methods may be illustrated and described as separate operations, one or more of the individual operations may be performed concurrently. The operations may not be required to be performed in the order illustrated. Structures and functionality presented as separate components in example configurations may be implemented as a combined structure or component. Similarly, structures and functionality presented as a single component may be implemented as separate components. These and other variations, modifications, additions, and improvements may fall within the scope of the subject matter herein.

Certain embodiments are described herein as including logic or a number of components, modules, or mechanisms, for example, as illustrated in FIGS. 3-12. Modules may constitute software modules (e.g., code embodied on a machine-readable medium or in a transmission signal), hardware modules, or a combination of hardware and software. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations may be examples of techniques used by those of ordinary skill in the data processing arts to convey the substance of their work to others skilled in the art. As used herein, an "algorithm" may refer to self-consistent sequence of operations or similar processing leading to a desired result. In this context, algorithms and operations may involve physical manipulation of physical quantities. Typically, but not necessarily, such quantities may take the form of electrical, magnetic, or optical signals capable of being stored, accessed, transferred, combined, compared, or otherwise manipulated by a machine. It may be convenient at times, principally for reasons of common usage, to refer to such signals using words such as "data," "content," "bits," "values," "elements," "symbols," "characters," "terms," "numbers," and/or "numerals." These words, however, are merely convenient labels and are to be associated with appropriate physical quantities.

Unless specifically stated otherwise, discussions herein using words such as "processing," "computing," "calculating," "determining," "presenting," and/or "displaying" may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, and/or apparatus that comprises a list of elements may not necessarily limited to only those elements but may include other elements not expressly listed or inherent to such process, method, article, or apparatus. Further, unless expressly stated to the contrary, "or" may refer to an inclusive or rather than to an exclusive or. For example, a condition A or B may be satisfied by any one of the following: A is true (or present) and B is false (or not present), A is false (or not present) and B is true (or present), and both A and B are true (or present).

In addition, use of the "a" or "an" are employed to describe elements and components of the embodiments herein. This may be done merely for convenience and to give a general sense of the invention. This description should be read to include one or at least one and the singular also includes the plural unless it is obvious that it is meant otherwise.

Upon reading this disclosure, those of skill in the art may appreciate still additional alternative structural and functional designs for a system and a process for calibrating a magnetometer. Thus, while particular embodiments and applications have been illustrated and described, it is to be understood that the disclosed embodiments are not limited to the precise construction and components disclosed herein. Various modifications, changes and variations, which may be apparent to those skilled in the art, may be made in the arrangement, operation and details of the method and apparatus disclosed herein without departing from the spirit and scope defined in the appended claims.

What is claimed is:

1. A method for calibrating a magnetometer, the method comprising:
   determining a position with a global navigation satellite system receiver;
   determining a magnetic inclination based on the determined position;
   responsive to a determination that the magnetic inclination is less than a threshold:
      measuring first magnetic field data by detecting a magnetic field with the magnetometer through a first rotation path, the first rotation path about a vertical axis and about a first axis respective to the magnetometer;
      measuring second magnetic field data by detecting the magnetic field with the magnetometer through a second rotation path, the second rotation path about the vertical axis and about a second axis respective to the magnetometer, the first axis different than the second axis; and
      determining calibration values for the magnetometer based on the measured first magnetic field data and the measured second magnetic field data; and
   responsive to a determination that the magnetic inclination is greater than the threshold:
      measuring third magnetic field data by detecting the magnetic field with the magnetometer through a third rotation path, the third rotation path about a first horizontal axis and about the first axis respective to the magnetometer;
      measuring fourth magnetic field data by detecting the magnetic field with the magnetometer through a fourth rotation path, the fourth rotation path about a second horizontal axis and about the second axis respective to the magnetometer; and
      determining calibration values for the magnetometer based on the measured third magnetic field data and the measured fourth magnetic field data.

2. The method of claim 1 wherein determining whether the magnetic inclination is less than the threshold comprises determining whether an absolute value of the magnetic inclination is less than the threshold.

3. The method of claim 1 wherein determining the magnetic inclination based on the determined position comprises applying a global magnetic field model.

4. The method of claim 1 wherein measuring first magnetic field data by detecting a magnetic field with the magnetometer through a first rotation path comprises associating data from the first magnetometer field data with orientation data detected by an inertial measurement device.

5. The method of claim 1 further comprising:
outputting, responsive to the determination that the magnetic inclination is less than a threshold, an indication, through an output device, to rotate the magnetometer through the first rotation path.

6. The method of claim 5 wherein the output device has a screen and wherein outputting the indication, through the output device, to rotate the magnetometer through the first rotation path comprises transmitting, to the output device through a wireless network, a command to display the indication.

7. The method of claim 1 wherein the method further comprises, responsive to the determination that the magnetic inclination is greater than the threshold, measuring fifth magnetic field data by detecting the magnetic field with the magnetometer through a fifth rotation path, the fifth rotation path about a third horizontal axis and about a third axis respective to the magnetometer, the third axis different than the first and second axes, and wherein the determination of the calibration values for the magnetometer is further based on the measured fifth magnetic field data.

8. A non-transitory computer-readable storage medium comprising stored executable computer program instructions to calibrate a magnetometer, wherein the computer program instructions, when executed by at least one computer processor, cause the computer processor to:
determine a position with a global navigation satellite system receiver;
determine a magnetic inclination based on the determined position;
responsive to a determination that the magnetic inclination is less than a threshold:
measure first magnetic field data by detecting a magnetic field with the magnetometer through a first rotation path, the first rotation path about a vertical axis and about a first axis respective to the magnetometer;
measure second magnetic field data by detecting the magnetic field with the magnetometer through a second rotation path, the second rotation path about the vertical axis and about a second axis respective to the magnetometer, the first axis different than the second axis; and
determine calibration values for the magnetometer based on the measured first magnetic field data and the measured second magnetic field data; and
responsive to a determination that the magnetic inclination is greater than the threshold:
measure third magnetic field data by detecting the magnetic field with the magnetometer through a third rotation path, the third rotation path about a first horizontal axis and about the first axis respective to the magnetometer;
measure fourth magnetic field data by detecting the magnetic field with the magnetometer through a fourth rotation path, the fourth rotation path about a second horizontal axis and about the second axis respective to the magnetometer; and
determine calibration values for the magnetometer based on the measured third magnetic field data and the measured fourth magnetic field data.

9. The non-transitory computer-readable storage medium of claim 8 wherein the instructions to determine whether the magnetic inclination is less than the threshold further comprise instructions to determine whether an absolute value of the magnetic inclination is less than the threshold.

10. The non-transitory computer-readable storage medium of claim 8 wherein the instructions to determine the magnetic inclination based on the determined position further comprise instructions to apply a global magnetic field model.

11. The non-transitory computer-readable storage medium of claim 8 wherein the instructions to measure the first magnetic field data by detecting a magnetic field with the magnetometer through a first rotation path further comprise instructions to associate data from the first magnetometer field data with orientation data detected by an inertial measurement device.

12. The non-transitory computer-readable storage medium of claim 8, further comprising computer program instructions that when executed cause the computer processor to:
output, responsive to the determination that the magnetic inclination is less than a threshold, an indication, through an output device, to rotate the magnetometer through the first rotation path.

13. The non-transitory computer-readable storage medium of claim 12 wherein the instructions to output the indication, through the output device, to rotate the magnetometer through the first rotation path further comprise instructions to transmit, to the output device through a wireless network, a command to display the indication on a screen of the device.

14. The non-transitory computer-readable storage medium of claim 8, further comprising computer program instructions that when executed cause the computer processor to:
measure, responsive to the determination that the magnetic inclination is greater than the threshold, fifth magnetic field data by detecting the magnetic field with the magnetometer through a fifth rotation path, the fifth rotation path about a third horizontal axis and about a third axis respective to the magnetometer, the third axis different than the first and second axes, and
determine the calibration values for the magnetometer based on the detected fifth magnetic field data.

15. A device comprising:
a magnetometer;
an inertial measurement device to detect rotation of the device through rotation paths;
a global navigation satellite system receiver to determine a position of the device;
at least one computer processor, the computer processor configured to execute instructions to:
determine a magnetic inclination based on the position determined by the global navigation satellite system receiver;
responsive to a determination that the magnetic inclination is less than a threshold:
measure first magnetic field data by detecting a magnetic field with the magnetometer through a first rotation path, the first rotation path about a vertical axis and about a first axis respective to the magnetometer;

measure second magnetic field data by detecting the magnetic field with the magnetometer through a second rotation path, the second rotation path about the vertical axis and about a second axis respective to the magnetometer, the first axis different than the second axis; and determine calibration values for the magnetometer based on the detected first magnetic field data and the detected second magnetic field data; and responsive to a determination that the magnetic inclination is greater than the threshold:

measure third magnetic field data by detecting the magnetic field with the magnetometer through a third rotation path, the third rotation path about a first horizontal axis and about the first axis respective to the magnetometer;

measure fourth magnetic field data by detecting the magnetic field with the magnetometer through a fourth rotation path, the fourth rotation path about a second horizontal axis and about the second axis respective to the magnetometer; and determine calibration values for the magnetometer based on the detected third magnetic field data and the detected fourth magnetic field data.

16. The device of claim 15, wherein the instructions, executed by the processor, to determine whether the magnetic inclination is less than the threshold further comprise instructions to determine whether an absolute value of the magnetic inclination is less than the threshold.

17. The device of claim 15, wherein the instructions, executed by the processor, to determine the magnetic inclination based on the determined position further comprise instructions to apply a global magnetic field model.

18. The device of claim 15, wherein the instructions, executed by the processor, to measure first magnetic field data by detecting a magnetic field with the magnetometer through a first rotation path further comprise instructions to associate data from the first magnetometer field data with orientation data detected by the inertial measurement device.

19. The device of claim 15, wherein the instructions, executed by the processor, further comprise instructions to:

transmit, responsive to the determination that the magnetic inclination is less than a threshold, through a wireless network, to an output device with a screen, a command to display on the screen an indication to rotate the magnetometer through the first rotation path.

20. The device of claim 15, wherein the instructions, executed by the processor, further comprise instructions to:

measure, responsive to the determination that the magnetic inclination is greater than the threshold, fifth magnetic field data by detecting the magnetic field with the magnetometer through a fifth rotation path, the fifth rotation path about a third horizontal axis and about a third axis respective to the magnetometer, the third axis different than the first and second axes, and determine the calibration values for the magnetometer based on the detected fifth magnetic field data.

* * * * *